US012028927B2

(12) United States Patent
Kedalagudde et al.

(10) Patent No.: US 12,028,927 B2
(45) Date of Patent: Jul. 2, 2024

(54) CONNECTION RESUME PROCEDURE FOR UE IN EDRX AND RRC INACTIVE STATE FOR MT DATA

(71) Applicant: Apple Inc., Cupertino, CA (US)

(72) Inventors: Meghashree Dattatri Kedalagudde, Cupertino, CA (US); Puneet Jain, Cupertino, CA (US); Alexandre Saso Stojanovski, Paris (FR); Robert Zaus, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 17/440,852

(22) PCT Filed: Apr. 2, 2020

(86) PCT No.: PCT/US2020/026451
§ 371 (c)(1),
(2) Date: Sep. 20, 2021

(87) PCT Pub. No.: WO2020/206166
PCT Pub. Date: Oct. 8, 2020

(65) Prior Publication Data
US 2022/0151014 A1    May 12, 2022

Related U.S. Application Data

(60) Provisional application No. 62/828,344, filed on Apr. 2, 2019.

(51) Int. Cl.
*H04W 76/28* (2018.01)
*H04W 68/00* (2009.01)
*H04W 76/27* (2018.01)

(52) U.S. Cl.
CPC ......... *H04W 76/28* (2018.02); *H04W 68/005* (2013.01); *H04W 76/27* (2018.02)

(58) Field of Classification Search
CPC .... H04W 76/28; H04W 76/27; H04W 68/005
(Continued)

(56) References Cited

U.S. PATENT DOCUMENTS

2016/0211986 A1* 7/2016 Diachina ............. H04W 68/005
2018/0270896 A1* 9/2018 Faccin ................... H04W 4/70
(Continued)

FOREIGN PATENT DOCUMENTS

| CN | 109155909 | 1/2019 |
| WO | WO 2018/167219 | 9/2018 |

OTHER PUBLICATIONS

[No Author Listed], "3rd Generation Partnership Project; Technical Specification Group Radio Access Network; Evolved Universal Terrestrial Radio Access (E-UTRA); Radio Resource Control (RRC); Protocol specification (Release 15)," 3GPP Ts 36.331 V15.4.0, Dec. 2018, 933 pages.
(Continued)

*Primary Examiner* — Mark G. Pannell
(74) *Attorney, Agent, or Firm* — Fish & Richardson P.C.

(57) ABSTRACT

Techniques, systems, and devices to support user equipment (UE) in an extended discontinuous reception mode are described. A described technique performed by a radio access network (RAN) includes managing UE that is in an extended discontinuous reception mode and in an inactive state; sending a notification message to an access and mobility management function (AMF), the message comprising buffer support information for a user plane function (UPF) to buffer data; receiving a notification request message from the AMF, the notification request message comprising a request to obtain information regarding reachability of the UE; sending a notification response message to control when the UPF provides downlink data to the RAN for transmission to the UE; performing a connection resume
(Continued)

procedure with the UE to cause the UE to switch to a connected state from the inactive state; receiving the downlink data; and transmitting the downlink data to the UE.

18 Claims, 13 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2019/0007992 A1 | 1/2019 | Kim et al. | |
| 2019/0059067 A1 | 2/2019 | Lee et al. | |
| 2021/0076352 A1* | 3/2021 | Chen | H04W 76/27 |
| 2021/0219264 A1* | 7/2021 | Chen | H04W 72/12 |
| 2021/0368408 A1* | 11/2021 | Deng | H04W 36/02 |
| 2022/0015181 A1* | 1/2022 | Rönneke | H04W 76/30 |

OTHER PUBLICATIONS

[No Author Listed], "3rd Generation Partnership Project; Technical Specification Group Radio Access Network; NG-RAN; NG Application Protocol (NGAP) (Release 15)," 3GPP TS 38.413 V 15.2.0, Dec. 2018, 308 pages.
[No Author Listed], "3rd Generation Partnership Project; Technical Specification Group Radio Access Network; NR; NR and NG-RAN Overall Description; Stage 2 (Release 15)," 3GPP TS 38.300 V 15.4.0, Dec. 2018, 97 pages.
[No Author Listed], "3rd Generation Partnership Project; Technical Specification Group Radio Access Network; NR; Radio Resource Control (RRC) protocol specification (Release 15)," 3GPP TS 38.331 V 15.4.0, Dec. 2018, 474 pages.
[No Author Listed], "3rd Generation Partnership Project; Technical Specification Group Services and System Aspects; Procedures for the 5G System; Stage 2 (Release 16)," 3GPP TS 23.502 V 16.0.0, Mar. 2019, 420 pages.
[No Author Listed], "3rd Generation Partnership Project; Technical Specification Group Services and System Aspects; Service requirements for the 5G system; Stage 1 (Release 16)," 3GPP TS 22.261 V 16.7.0, Mar. 2019, 72 pages.
[No Author Listed], "3rd Generation Partnership Project; Technical Specification Group Services and System Aspects; System Architecture for the 5G System; Stage 2 (Release 16)," 3GPP TS 23.501 V 16.0.0, Mar. 2019, 318 pages.
Ericsson, "Fixing UE power efficiency," 3GPP SA WG2 Meeting #128BIS, S2-188438, Sophia Antipolis, France, Aug. 20-24, 2018, 9 pages.
Ericsson, "Fixing UE power efficiency," 3GPP SA WG2 Meeting #128BIS, S2-188901, Sophia Antipolis, France, Aug. 20-24, 2018, 9 pages.
Ericsson, "KI2 UE power efficiency resolved," 3GPP SA WG2 Meeting #129, S2-1811231, Dongguan, P.R. China, Oct. 15-19, 2018, 19 pages.
Ericsson, "KI3: Paging of power saving UEs," 3GPP SA WG2 Meeting #128, S2-187266, Vilnius, Lithuania, Jul. 2-6, 2018, 7 pages.
International Preliminary Report on Patentability in International Appln. No. PCT/US2020/026451, mailed on Oct. 14, 2021, 8 pages.
International Search Report and Written Opinion in International Appln. No. PCT/US2020/026451, mailed on Aug. 14, 2020, 10 pages.

* cited by examiner

CONNECTION RESUME PROCEDURE FOR UE IN EDRX AND RRC INACTIVE STATE FOR MT DATA

CROSS-REFERENCE TO RELATED APPLICATION

This application is a National Stage Application under 35 U.S.C. § 371 of International Application No. PCT/US2020/026451, filed on Apr. 2, 2020, which claims the benefit of the priority of U.S. Provisional Patent Application No. 62/828,344, entitled "CONNECTION RESUME PROCEDURE FOR UE IN EDRX AND RRC INACTIVE STATE FOR MT DATA" and filed on Apr. 2, 2019 The above-identified applications are incorporated herein by reference in their entirety.

TECHNICAL FIELD

This disclosure relates generally to signaling in wireless communication systems.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating, many wireless communication systems share the available communication channel resources among devices. Internet-of-Thing (IoT) devices are also growing in usage and can coexist with user devices in various wireless communication systems such as cellular networks.

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Techniques, systems, and devices to support user equipment (UE) in an extended discontinuous reception mode are described. A described technique includes managing, by a RAN, a UE that is in an extended discontinuous reception mode and in an inactive state; sending, by the RAN, a notification message to an access and mobility management function (AMF), the notification message including information to cause a user plane function (UPF) to buffer data for the UE; receiving, by the RAN, a notification request message from the AMF, the notification request message comprising a request to obtain information regarding reachability of the UE; sending, by the RAN, a notification response message to control when the UPF provides downlink data to the RAN for transmission to the UE; performing a connection resume procedure with the UE to cause the UE to switch to a connected state from the inactive state; receiving, by the RAN, the downlink data from the UPF; and transmitting the downlink data to the UE. Other implementations include corresponding systems, apparatus, and computer programs to perform the actions of methods defined by instructions encoded on computer readable storage.

These and other implementations can include one or more of the following features. A RAN can be configured to determine a next paging occasion for the UE in accordance with the extended discontinuous reception mode. Implementations can include generating expected UE reachability information based on the next paging occasion. The notification response message can include the expected UE reachability information. The UPF can be configured to forward the downlink data in accordance with the expected UE reachability information.

Implementations can include transmitting, by the RAN, a page to the UE based on the next paging occasion to trigger the connection resume procedure. Sending the notification response message can be based on a completion of the connection resume procedure. The notification response message can include a notification that the UE is ready to receive data. The UPF can be configured to forward the downlink data upon receipt of the notification that the UE is ready to receive data.

In some implementations, the notification request message is triggered by receiving data at the UPF for the UE. In some implementations, the UE is associated with a first node of the RAN before entering a sleeping cycle in accordance with the extended discontinuous reception mode. Performing the connection resume procedure can include operating a second node of the RAN to perform the connection resume procedure with the UE. The UPF can be configured to forward the downlink data to the second node.

A RAN in a wireless communication system can include one or more processors; circuitry configured to communicate with devices such as a UE; circuitry configured to communicate with a device that provides an AMF; and a memory storing instructions that, when executed by the one or more processors, cause the one or more processors to perform operations. The operations can include managing a UE that is in an extended discontinuous reception mode and in an inactive state; sending a notification message to the AMF, the notification message comprising buffer support information for a UPF to buffer data for the UE; receiving a notification request message from the AMF, the notification request message comprising a request to obtain information regarding reachability of the UE; sending a notification response message to control when the UPF provides downlink data to the RAN for transmission to the UE; performing a connection resume procedure with the UE to cause the UE to switch to a connected state from the inactive state; receiving the downlink data from the UPF; and transmitting the downlink data to the UE.

These and other implementations can include one or more of the following features. The operations can include determining a next paging occasion for the UE in accordance with the extended discontinuous reception mode. The operations can include generating expected UE reachability information based on the next paging occasion. The notification response message can include the expected UE reachability information. The UPF can be configured to forward the downlink data in accordance with the expected UE reachability information. The operations can include transmitting, by the RAN, a page to the UE based on the next paging occasion to trigger the connection resume procedure. Sending the notification response message can be based on a completion of the connection resume procedure. The notification response message can include a notification that the UE is ready to receive data. The UPF can be configured to forward the downlink data upon receipt of the notification that the UE is ready to receive data. The notification request message can be triggered by receiving data at the UPF for the UE. In some implementations, the UE is associated with a first node of the RAN before entering a sleeping cycle in accordance with the extended discontinuous reception mode, and performing the connection resume procedure can include causing a second node of the RAN to perform the connection resume procedure with the UE. The UPF can be configured to forward the downlink data to the second node.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

In many wireless communication systems, including long-term evolution (LTE) and fifth generation new radio (5G NR) cellular networks, a user equipment (UE) may need to transmit a small amount of data to a base station (BS) within the network. For example, in a Cellular Internet of Things (CIoT), a sensor device equipped with a communication device such as a user equipment (UE) can take a sensor reading and then transmit the reading, or a batch of readings, to the BS. Other examples include tracking devices for Mobile Originated (MO) and Mobile Terminated (MT) use cases that report positions via a BS. The present disclosure describes, among other things, signaling mechanisms to support frequent small data transmission without path switching between different base stations.

Figure 1:
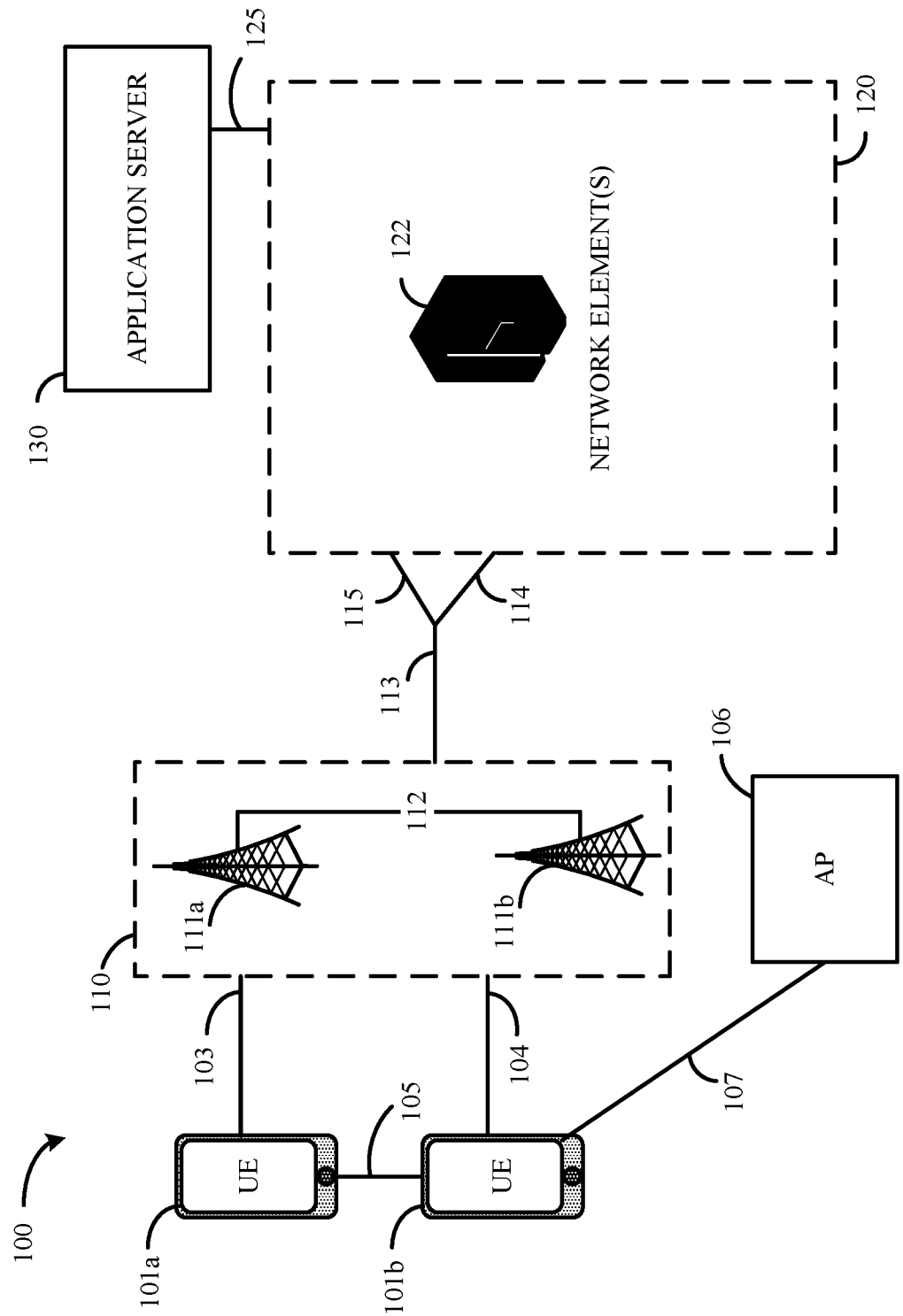
FIG. 1 illustrates an example of a wireless communication system.

FIG. 1 illustrates an example of a wireless communication system 100. For purposes of convenience and without limitation, the example system 100 is described in the context of the LTE and 5G NR communication standards as defined by the Third Generation Partnership Project (3GPP) technical specifications. However, other types of wireless standards are possible.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 can include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages or status updates) to facilitate the connections of the IoT network. In some implementations, one or more of the UEs 110 can be figured for discontinuous reception mode (DRX) communications. In some implementations, one or more of the UEs 110 can be figured for extended DRX (eDRX) communications.

The UEs 101 are configured to connect (e.g., communicatively couple) with a radio access network (RAN) 110. In some implementations, the RAN 110 may be a next generation RAN (NG-RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG-RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which can include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi) router. In this example, the AP 106 is shown to be connected to the Internet without connecting to the core network of the wireless system, as described in further detail below.

The RAN 110 can include one or more nodes such as RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG-RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some implementations, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some implementations, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111 a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some implementations, an individual RAN node 111 may represent individual gNB distributed units (DUs) that are connected to a gNB central unit (CU) using individual F1 interfaces (not shown in FIG. 1). In some implementations, the gNB-DUs can include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

The RAN nodes 111 can transmit to the UEs 101 over various channels. Various examples of downlink communication channels include Physical Broadcast Channel (PBCH), Physical Downlink Control Channel (PDCCH), and Physical Downlink Shared Channel (PDSCH). Other types of downlink channels are possible. The UEs 101 can transmit to the RAN nodes 111 over various channels. Various examples of uplink communication channels include Physical Uplink Shared Channel (PUSCH), Physical Uplink Control Channel (PUCCH), and Physical Random Access Channel (PRACH). Other types of uplink channels are possible.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid can include a number of resource blocks, which describe the mapping of certain physical channels to resource elements. Each resource block can include a collection of resource elements; in the frequency domain, this may represent the smallest quantity of resources that currently can be allocated. There are several different physical downlink channels that are conveyed using such resource blocks.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARQ) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs.

Figure 2:
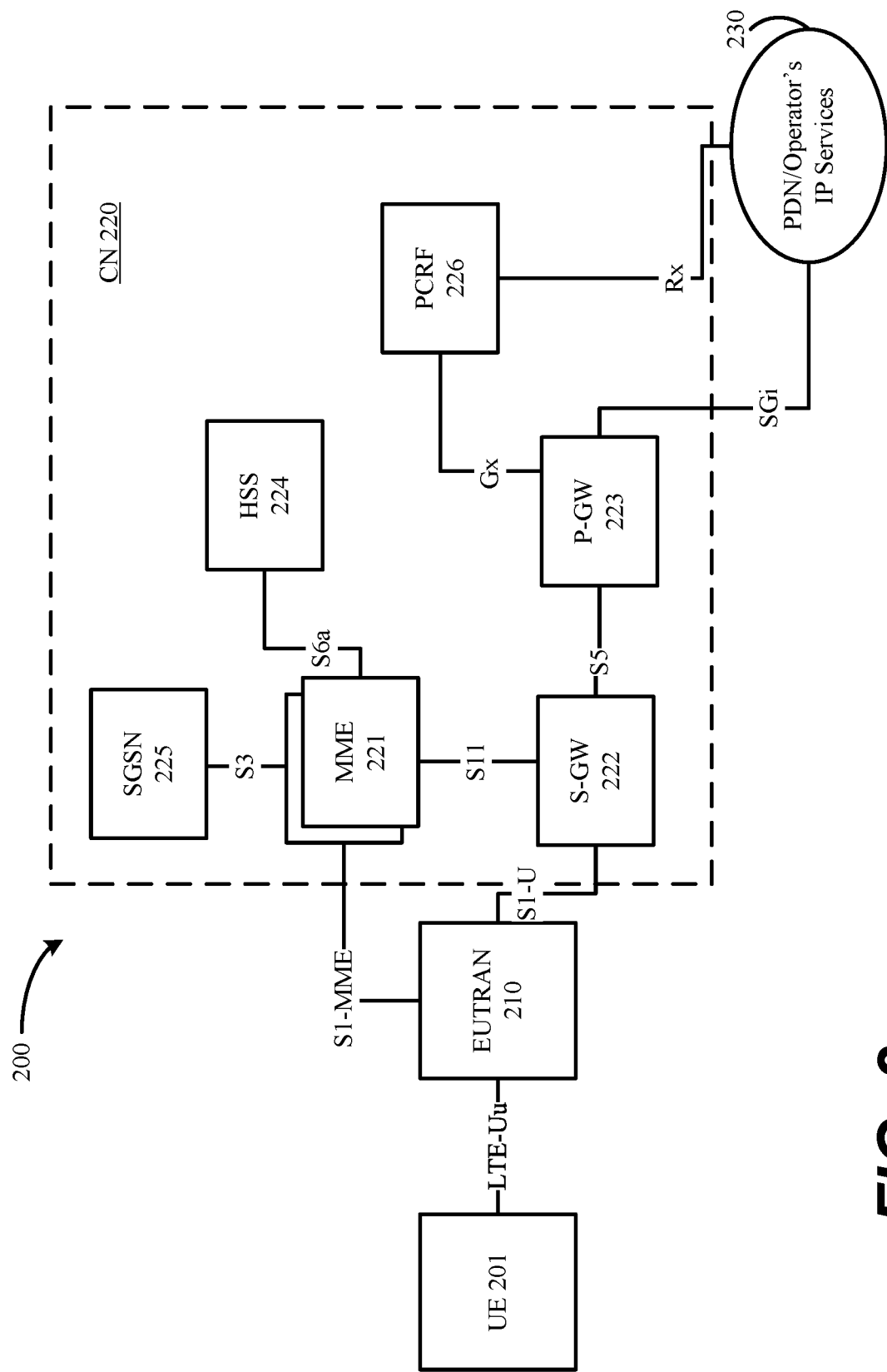
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
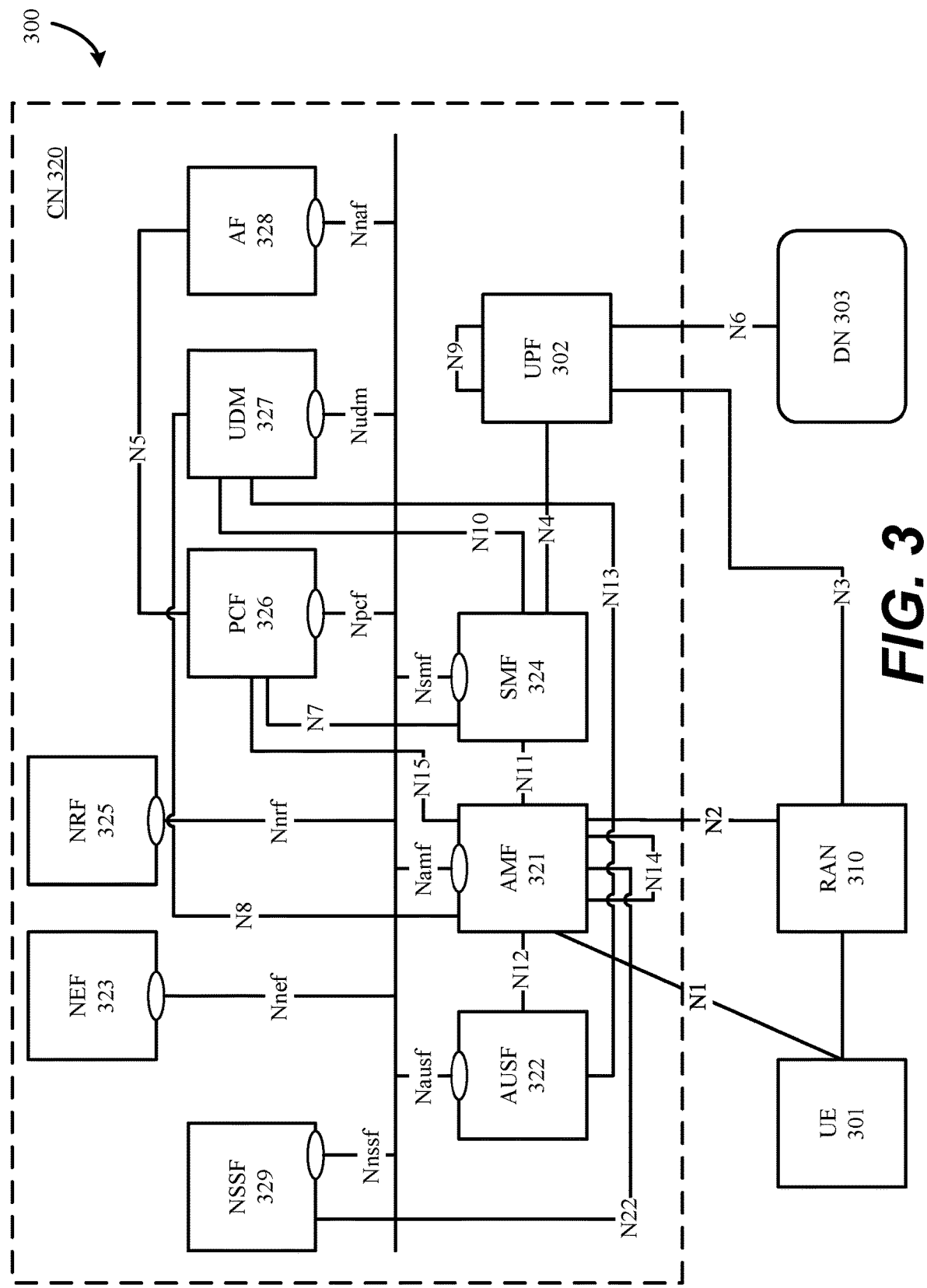
FIG. 3 illustrates another example architecture of a system including a core network.

In some implementations, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support can include context transfer from an old (source) serving RAN node 111 to new (target) serving RAN node 111, and control of user plane tunnels between old (source) serving RAN node 111 to new (target) serving RAN node 111. A protocol stack of the Xn-U can include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack can include an application layer signaling protocol (referred to as Xn Application Protocol (Xn-AP or XnAP)) and a transport network layer (TNL) that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and can include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 130 may be an element offering applications that use IP bearer resources with the core network (e.g., UMTS packet services (PS) domain, LTE PS data services, among others). The application server 130 can also be configured to support one or more communication services (e.g., VoIP sessions. PTT sessions, group communication sessions, social networking services, among others) for the UEs 101 using the CN 120. The application server 130 can use an IP communications interface 125 to communicate with one or more network elements 112.

In some implementations, the CN 120 may be a 5G core network (referred to as "5GC 120" or "5G core network 120"), and the RAN 110 may be connected with the CN 120 using a next generation interface 113. In some implementations, the next generation interface 113 may be split into two parts, an next generation user plane interface 114, which carries traffic data between the RAN nodes 111 and a user plane function (UPF), and the S1 control plane interface 115, which is a signaling interface between the RAN nodes 111 and access and mobility management functions (AMFs). Examples where the CN 120 is a 50 core network are discussed in more detail with regard to FIG. 3.

In some implementations, the CN 120 may be an EPC (referred to as "EPC 120" or the like), and the RAN 110 may be connected with the CN 120 using an S1 interface 113. In some implementations, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which can include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 can include an EMM sublayer, and a mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 can include a database for network users, including subscription-related information to support the network entities' handling of communication sessions. The EPC 220 can include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities can include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP communications interface 125 (see, e.g., FIG. 1). In some implementations, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously; a RAN 310, which may be the same or similar to the RAN 110 and RAN 210 discussed previously, and which can include RAN nodes 111 discussed previously; and a data network (DN) 303, which may be, for example, operator services, Internet access or 3rd party services; and a 5GC 320. The RAN 310 can be referred to as a 5G access network (5G-AN) or a 5G-RAN. The 5GC 320 can include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an application function (AF) 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 can include an uplink classifier to support routing traffic flows to a data network. The DN 303 may represent various network operator services, Internet access, or third party services. DN 303 can include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which can include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which can include or be a N2 reference point between the RAN 310 and the AMF 321. In some implementations, the AMF 321 may be a termination point of NAS (N1) signaling and perform NAS ciphering and integrity protection.

AMF 321 may also support NAS signaling with a UE 301 over a N3 interworking function (IWF) interface (referred to as the "N3IWF"). The N3IWF may be used to provide access to untrusted entities. The N3IWF may be a termination point for the N2 interface between the RAN 310 and the AMF 321 for the control plane, and may be a termination point for the N3 reference point between the RAN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N 14 reference point between two AMFs 321 and a N17 reference point between the AMF 321 and a 5G equipment identity registry (EM) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM- REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a SOC mobility management (MM) context that may be the same or similar to the (E)MM context discussed previously. In some implementations, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the RAN (e.g., RRC connection or UE-N3IWF connection for non-3GPP access) and the N2 connection for the UE 301 between the AN (e.g., RAN 310) and the AMF 321. In some implementations, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be RAN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a RAN 310 signaling connection (e.g., N2 and/or N3 connections) for the UE 301. Establishment of a N2 connection between the RAN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the RAN 310 and the AMF 321 is released.

When the UE 301 is in the CM-CONNECTED state with a RRC_INACTIVE state, the UE 301 may resume the RRC connection (e.g., using a connection resume procedure discussed herein) due to various events such as uplink data pending; mobile initiated NAS signaling procedure; as a response to RAN 310 paging; notifying the network that it has left the RAN Notification Area; and upon periodic RAN Notification Area Update timer expiration. If the UE 301 resumes the connection in a different NG-RAN node within the same PLMN or equivalent PLMN, the UE AS context is retrieved from the old NG-RAN node and a procedure is triggered towards the CN (see e.g., 3GPP TS 23.502, clause 4.8.2).

The AMF 321 can include mechanisms for avoiding and handling overload situations, including N2 overload control that could result in RRC reject, RRC connection release and unified access barring, and NAS congestion control.

Under unusual circumstances, if AMF 321 has reached an overload situation, the AMF 321 activates NAS level congestion control as specified in clause 5.19.7 of 3GPP TS 23.501 and AMF 321 restricts the load that the 5G-AN node(s) are generating, if the 5G-AN is configured to support overload control. N2 overload control can be achieved by the AMF 321 invoking the N2 overload procedure (see e.g., 3GPP TS 38.300 and 3GPP TS 38.413) to all or to a proportion of the 5G-AN nodes with which the AMF 321 has N2 connections. The AMF 321 may include network slice selection assistance information (NSSAI) such as a single NNSAI (S-NSSAI) in a NGAP OVERLOAD START message sent to 5G-AN node(s) to indicate the Network Slice(s) with which NAS signaling is to be restricted. To reflect the amount of load that the AMF 321 wishes to reduce, the AMF 321 can adjust the proportion of 5G-AN nodes which are sent NGAP OVERLOAD START message, and the content of the overload start procedure.

When NGAP OVERLOAD START is sent by multiple AMPs 321 or from the same AMF 321 set in the same PLMN towards the 5G-AN, it should be ensured that the signaling load is evenly distributed within the PLMN and within each AMF set.

A 5G-AN node, such as one or more nodes of RAN 310, can support restricting of 5G-AN signaling connection when a signaling connection establishment are attempted by certain UEs 301 (which are registered or attempting to register with the 5GC), as specified in 3GPP TS 38.331 and 3GPP TS 36.331. Additionally, a 5G-AN node provides support for the barring of UEs as described in 3GPP TS 22.261. These mechanisms are further specified in 3GPP TS 38.331 and 3GPP TS 36.331. For 3GPP Access Type, the signaling connection establishment attempt includes a RRC Connection Resume procedure from RRC-Inactive.

By sending the NGAP OVERLOAD START message, the AMF 321 can request a node of RAN 310 to apply the following behavior for UEs 301 that the AMF 321 is serving: restrict 5G-AN signaling connection requests that are not for emergency, not for exception reporting and not for high priority mobile originated services; or restrict 5G-AN signaling connection requests for uplink NAS signaling transmission to that AMF 321; only permit 5G-AN signaling connection requests for emergency sessions and mobile terminated services for that AMF 321; or only permit 5G-AN signaling connection requests for high priority sessions, exception reporting and mobile terminated services for that AMF 321. Another behavior includes restricting 5G-AN signaling connection requests where the Requested NSSAI at AS layer only includes the indicated S-NSSAI(s) in the NGAP OVERLOAD START message. This can apply to a RRC_INACTIVE connection resume procedure where the Allowed NSSAI in the stored UE context in the RAN only includes S-NSSAIs included in the NGAP OVERLOAD START. The above can apply for a RRC connection establishment and RRC connection resume procedures over 3GPP access and the UE-N3IWF connection establishment over N3GPP access.

The AMF 321 can provide a value that indicates the percentage of connection requests to be restricted in the NGAP OVERLOAD START, and the 5G-AN node may consider this value for congestion control. When restricting a 5G-AN signaling connection, the 5G-AN indicates to the UE an appropriate wait timer that limits further 5G-AN signaling connection requests until the wait timer expires. During an overload situation, the AMF 321 attempts to maintain support for emergency services and for MPS. When the AMF 321 is recovering, the AMF 321 can either send a NGAP OVERLOAD START message with a new percentage value that permits more connection requests to be successful, or send a NGAP OVERLOAD STOP message to the same 5G-AN node(s) the NGAP OVERLOAD START was previously sent.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 can include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some implementations, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "Instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which can include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 can include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM can include a UDM front end, which is in charge of processing credentials, location management, subscription management and soon. Several different front ends may serve the same user in different transactions. The UDM front end accesses subscription information stored in the UDR and performs authentication credential processing, user identification handling, access authorization, registration/mobility management, and subscription management. The UDM may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed S-NS-SAI, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 can include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 320 may also include other elements that are not shown in FIG. 3, such as a data storage system, a 5G-EIR, a security edge protection pro10 (SEPP), and the like. The data storage system can include a structured data storage function (SDSF), an unstructured data storage function (UDSF), or both, among others. Any network function may store and retrieve unstructured data to or from the UDSF (e.g., UE contexts), using a NIS reference point between any NF and the UDSF (not shown in FIG. 3). Individual network functions may share a UDSF for storing their respective unstructured data or individual network functions may each have their own UDSF located at or near the individual network functions. Additionally, the UDSF may exhibit a Nudsf service-based interface (not shown in FIG. 3). The 5G-EIR may be a network function that checks the status of permanent equipment identifiers (PEI) for determining whether particular equipment or entities are blacklisted from the network; and the SEPP may be a non-transparent pro10 that performs topology hiding, message filtering, and policing on inter-PLMN control plane interfaces.

In some implementations, there may be additional or alternative reference points or service-based interfaces, or both, between the network function services in the network functions. However, these interfaces and reference points have been omitted from FIG. 3 for clarity. In one example, the CN 320 can include a Nx interface, which is an inter-CN interface between the MME (e.g., MME 221) and the AMF 321 in order to enable interworking between CN 320 and CN 220. Other example interfaces or reference points can include a N5g-EIR service-based interface exhibited by a 5G-EIR, a N27 reference point between the NRF in the visited network and the NRF in the home network, or a N31 reference point between the NSSF in the visited network and the NSSF in the home network, among others.

In some implementations, the components of the CN 220 may be implemented in one physical node or separate physical nodes and can include components to read and execute instructions from a machine-readable or computer-readable medium (e.g., a non-transitory machine-readable storage medium). In some implementations, the components of CN 320 may be implemented in a same or similar manner as discussed herein with regard to the components of CN 220. In some implementations. NFV is utilized to virtualize any or all of the above-described network node functions using executable instructions stored in one or more computer-readable storage mediums, as described in further detail below. A logical instantiation of the CN 220 may be referred to as a network slice, and individual logical instantiations of the CN 220 may provide specific network capabilities and network characteristics. A logical instantiation of a portion of the CN 220 may be referred to as a network sub-slice, which can include the P-GW 223 and the PCRF 226.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice can include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. In some implementations, while the network can support large number of slices, the UE need not support more than 8 slices simultaneously.

A network slice can include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some implementations, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSAIs. Moreover, an AMF 321 instance serving an individual UE 301 may belong to each of the network slice instances serving that UE.

Network slicing in the RAN 310 involves RAN slice awareness. RAN slice awareness includes differentiated handling of traffic for different network slices, which have been pre-configured. Slice awareness in the RAN 310 is introduced at the PDU session level by indicating the S-NSSAI corresponding to a PDU session in all signaling that includes PDU session resource information. How the RAN 310 supports the slice enabling in terms of NG-RAN functions (e.g., the set of network functions that comprise each slice) is implementation dependent. The RAN 310 selects the RAN part of the network slice using assistance information provided by the UE 301 or the 5GC 320, which unambiguously identifies one or more of the pre-configured network slices in the PLMN. The RAN 310 also supports resource management and policy enforcement between slices as per SLAs. A single NG-RAN node may support multiple slices, and the RAN 310 may also apply an appropriate RRM policy for the SLA in place to each supported slice. The RAN 310 may also support QoS differentiation within a slice.

The RAN 310 may also use the UE assistance information for the selection of an AMF 321 during an initial attach, if available. The RAN 310 uses the assistance information for routing the initial NAS to an AMF 321. If the RAN 310 is unable to select an AMF 321 using the assistance information, or the UE 301 does not provide any such information, the RAN 310 sends the NAS signaling to a default AMF 321, which may be among a pool of AMFs 321. For subsequent accesses, the UE 301 provides a temp ID, which is assigned to the UE 301 by the 5GC 320, to enable the RAN 310 to route the NAS message to the appropriate AMF 321 as long as the temp ID is valid. The RAN 310 is aware of, and can reach, the AMF 321 that is associated with the temp ID. Otherwise, the method for initial attach applies.

The RAN 310 supports resource isolation between slices. RAN 310 resource isolation may be achieved by means of RRM policies and protection mechanisms that should avoid that shortage of shared resources if one slice breaks the service level agreement for another slice. In some implementations, it is possible to fully dedicate RAN 310 resources to a certain slice. How RAN 310 supports resource isolation is implementation dependent.

Some slices may be available only in part of the network. Awareness in the RAN 310 of the slices supported in the cells of its neighbors may be beneficial for inter-frequency mobility in connected mode. The slice availability may not change within the UE's registration area. The RAN 310 and the 5GC 320 are responsible to handle a service request for a slice that may or may not be available in a given area. Admission or rejection of access to a slice may depend on factors such as support for the slice, availability of resources, support of the requested service by RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the RAN 310 may be allowed to apply some provisional or local policies based on awareness of a particular slice that the UE 301 is requesting to access. During the initial context setup, the RAN 310 is informed of the slice for which resources are being requested.

Figure 4:
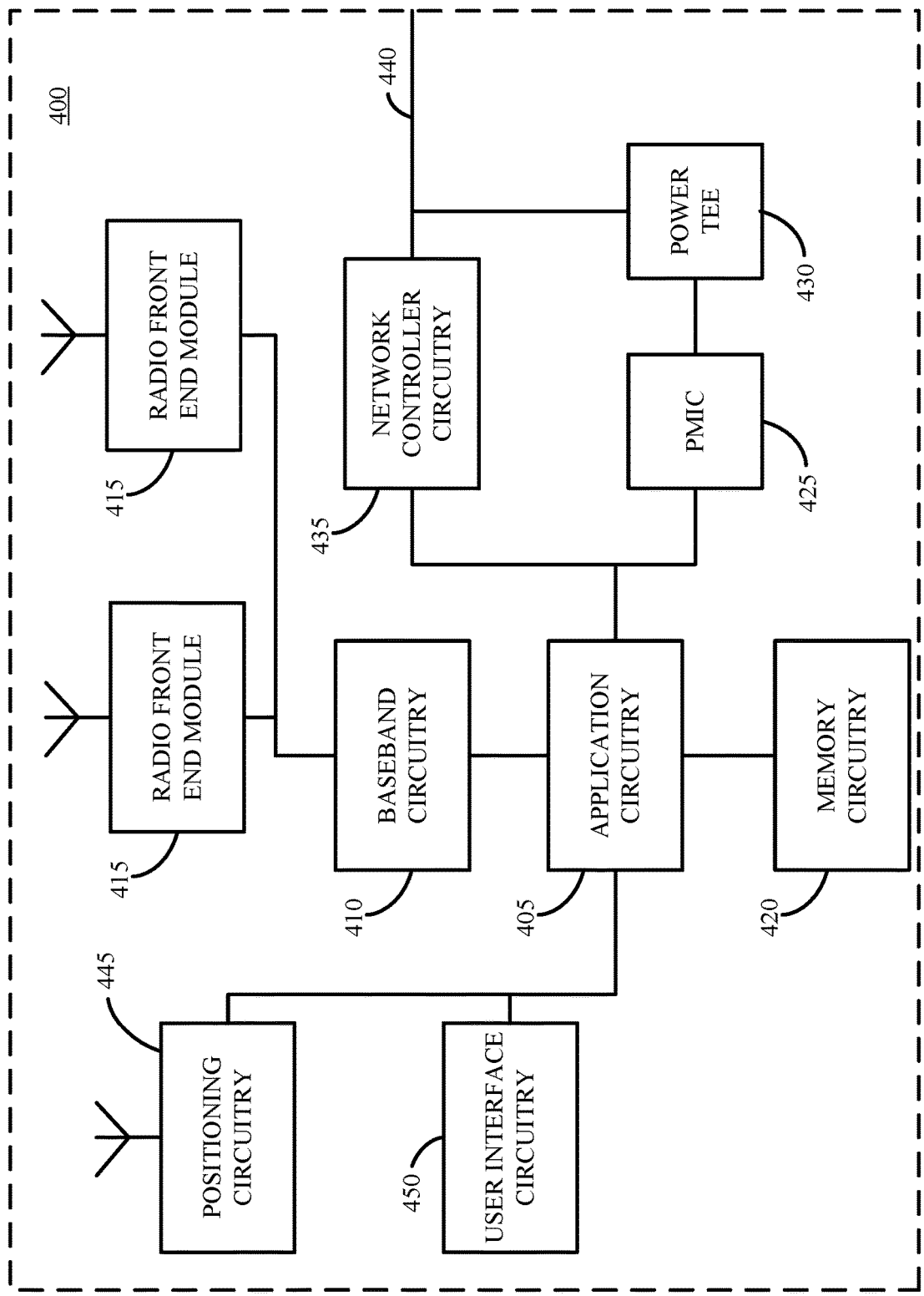
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 or AP 106 shown and described previously, an application server 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the system 400 can include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD), MultiMediaCard (MMC), or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or can include memory or storage elements and may be configured to execute instructions stored in the memory or storage to enable various applications or operating systems to run on the system 400. In some implementations, the memory or storage elements can include on-chip memory circuitry, which can include any suitable volatile or non-volatile memory, such as DRAM, SRAM, EPROM, EEPROM, Flash memory, solid-state memory, or combinations of them, among other types of memory.

The processor(s) of the application circuitry 405 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some implementations, the application circuitry 405 can include, or may be, a special-purpose processor or controller configured to carry out the various techniques described here. In some implementations, the system 400 may not utilize application circuitry 405, and instead can include a special-purpose processor or controller to process IP data received from an EPC or 5GC, for example.

In some implementations, the application circuitry 405 can include one or more hardware accelerators, which may be microprocessors, programmable processing devices, or the like. The one or more hardware accelerators can include, for example, computer vision or deep learning accelerators, or both. In some implementations, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 can include logic blocks or logic fabric, and other interconnected resources that may be programmed to perform various functions, such as the procedures, methods, functions described herein. In some implementations, the circuitry of application circuitry 405 can include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits.

The user interface circuitry 450 can include one or more user interfaces designed to enable user interaction with the system 400 or peripheral component interfaces designed to enable peripheral component interaction with the system 400. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces can include, but are not limited to, a nonvolatile memory port, a universal serial bus (USB) port, an audio jack, a power supply interface, among others.

The radio front end modules (RFEMs) 415 can include a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 415, which incorporates both mmWave antennas and sub-mmWave.

The memory circuitry 420 can include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. Memory circuitry 420 may be implemented as one or more of solder down packaged integrated circuits, socketed memory modules and plug-in memory cards, for example.

The PMIC 425 can include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels. Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 can include one or more dedicated processors or FPGAs, or both, to communicate using one or more of the aforementioned protocols. In some implementations, the network controller circuitry 435 can include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS). France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 can include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 4 may communicate with one another using interface circuitry, which can include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system.

Other bus or IX systems may be included, such as an I2C interface, an SPI interface, point to point interfaces, and a power bus, among others.

Figure 5:
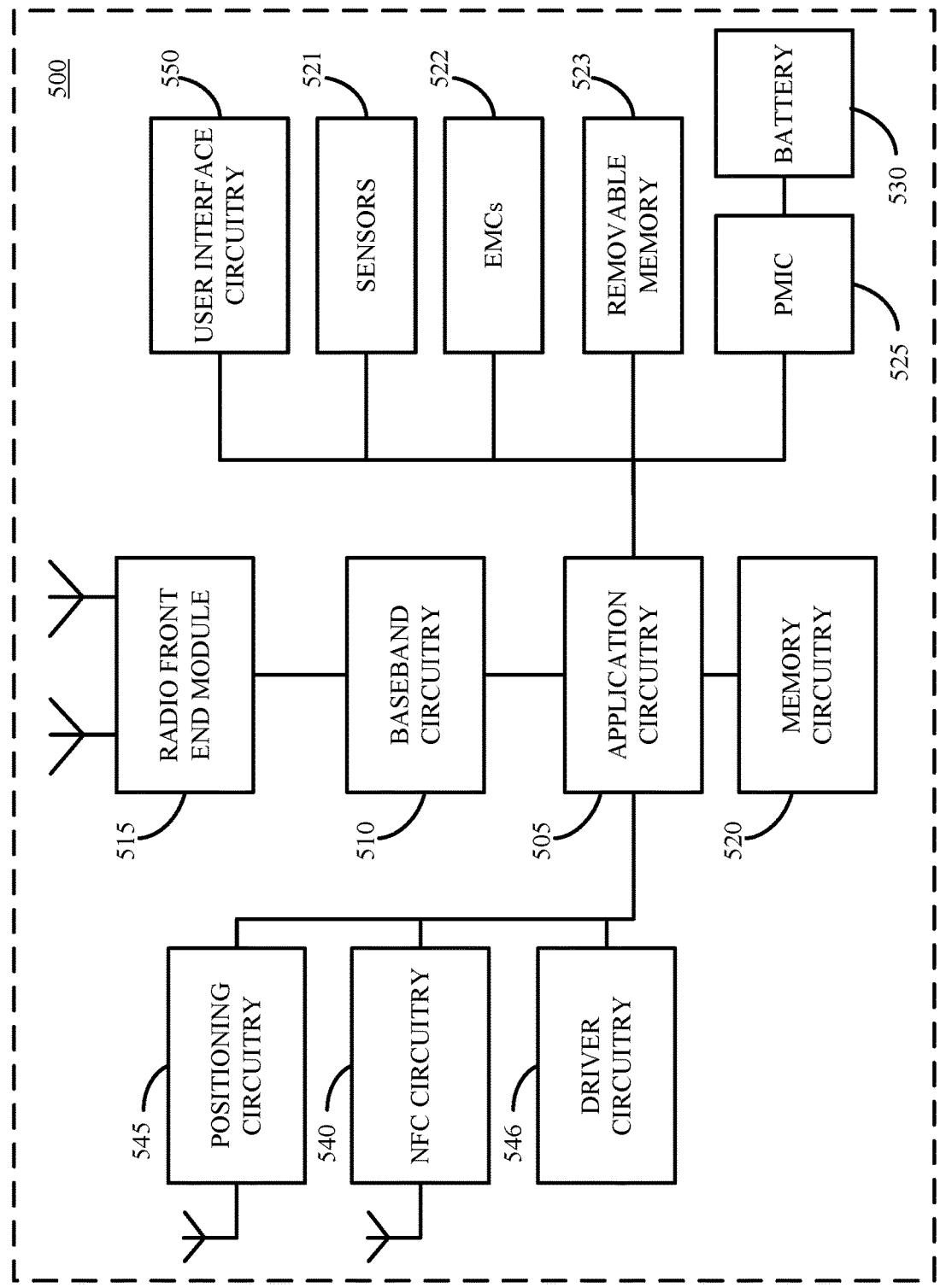
FIG. 5 illustrates an example of a platform or device.

FIG. 5 illustrates an example of a platform 500 (or "device 500"). In some implementations, the computer platform 500 may be suitable for use as UEs 101, 201, 301, application servers 130, or any other component or device discussed herein. The platform 500 can include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some implementations, the platform 500 can include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or can include memory/storage elements and may be configured to execute instructions stored in the memory or storage to enable various applications or operating systems to run on the platform 500. In some implementations, the memory or storage elements may be on-chip memory circuitry, which can include any suitable volatile or non-volatile memory, such as DRAM, SRAM, EPROM, EEPROM, Flash memory, solid-state memory, or combinations of them, among other types of memory.

The processor(s) of application circuitry 505 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 can include, or may be, a special-purpose processor/controller to carry out the techniques described herein. In some implementations, the application circuitry 505 may be a part of a system on a chip (SoC) in which the application circuitry 505 and other components are formed into a single integrated circuit, or a single package.

Additionally or alternatively, the application circuitry 505 can include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some implementations, the application circuitry 505 can include logic blocks or logic fabric, and other interconnected resources that may be programmed to perform various functions, such as the procedures, methods, functions described herein. In some implementations, the application circuitry 505 can include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 515, which incorporates both mmWave antennas and sub-mmWave.

The memory circuitry 520 can include any number and type of memory devices used to provide for a given amount of system memory. As examples, the memory circuitry 520 can include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 520 may be on-die memory or registers associated with the application circuitry 505. To provide for persistent storage of information such as data, applications, operating systems and so forth, memory circuitry 520 can include one or more mass storage devices, which can include, for example, a solid state disk drive (SSDD), hard disk drive (HDD), a micro HDD, resistance change memories, phase change memories, holographic memories, or chemical memories, among others.

The removable memory circuitry 523 can include devices, circuitry, enclosures, housings, ports or receptacles, among others, used to couple portable data storage devices with the platform 500. These portable data storage devices may be used for mass storage purposes, and can include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors, proximity sensors (e.g., infrared radiation detector and the like), depth sensors, ambient light sensors, ultrasonic transceivers; microphones or other audio capture devices, or combinations of them among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, damps, hooks, or combinations of them, among other electro-mechanical components. In some implementations, the platform 500 is configured to operate one or more EMCs 522 based on one or more captured events, instructions, or control signals received from a service provider or clients, or both.

In some implementations, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 545 can include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 can include software and hardware elements that operate to control particular devices that are embedded in the platform 500, attached to the platform 500, or otherwise communicatively coupled with the platform 500. The driver circuitry 546 can include individual drivers allowing other components of the platform 500 to interact with or control various input/output (I/O) devices that may be present within, or connected to, the platform 500. For example, the driver circuitry 546 can include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC driven to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_CONNECTED state, where it is still connected to the RAN node as it expects to receive traffic shortly, then it may enter a state associated with DRX or eDRX after a period of inactivity. During this state, the platform 500 may power down for brief intervals of time and thus save power. If there is no data traffic activity for an extended period of time, then the platform 500 may transition off to an RRC_IDLE state, where it disconnects from the network and does not perform operations such as channel quality feedback or handover. This can allow the platform 500 to enter a very low power state, where it periodically wakes up to listen to the network and then powers down again. In some implementations, the platform 500 may not receive data in the RRC_IDLE state and instead must transition back to RRC_CONNECTED state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some implementations the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry can include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some implementations, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces can include, but are not limited to, a non-volatile memory port, a USB port, an audio jack, or a power supply interface.

Although not shown, the components of platform 500 may communicate with one another using a suitable bus or interconnect (IX) technology, which can include any number of technologies, including ISA, EISA, PCI, PCIx, PCe, a Time-Trigger Protocol (TTP) system, a FlexRay system, or any number of other technologies. The bus or IX may be a proprietary bus or IX, for example, used in a SoC based system. Other bus or IX systems may be included, such as an 12C interface, an SPI interface, point-to-point interfaces, and a power bus, among others.

Figure 6:
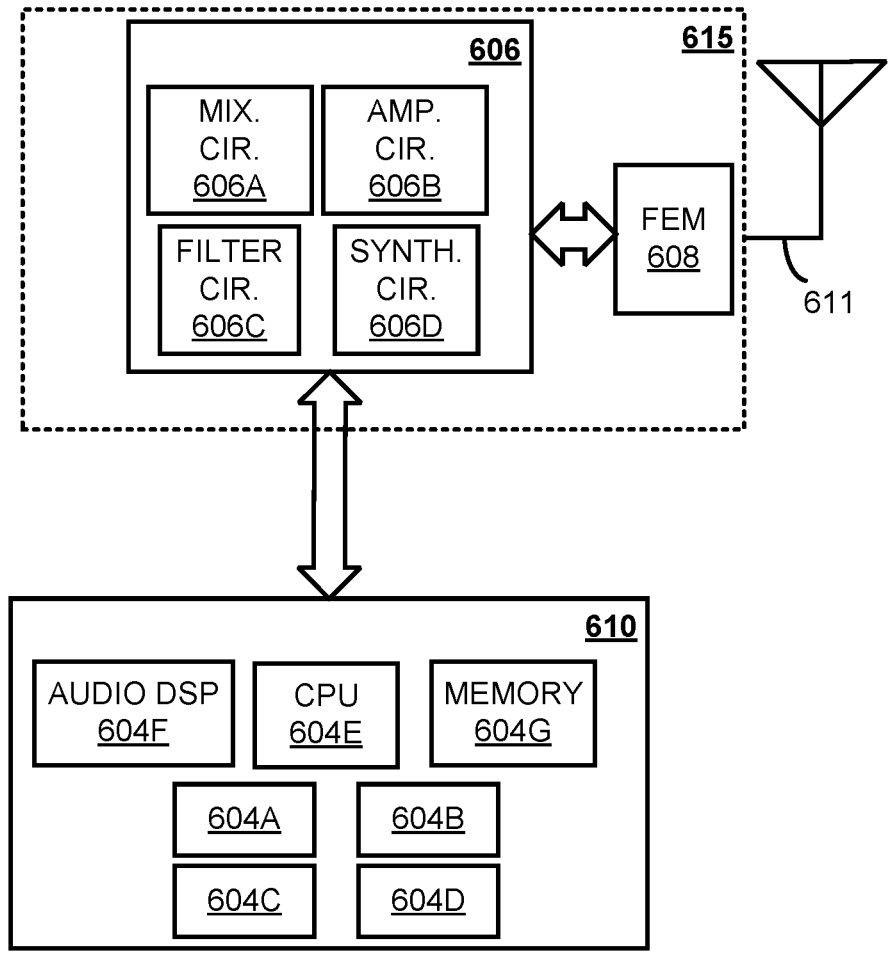
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 can include Radio Frequency (RF) circuitry 606, front-end module (FEM) circuitry 608, and antenna array 611 coupled together.

The baseband circuitry 610 includes circuitry configured to carry out various radio or network protocol and control functions that enable communication with one or more radio networks using the RF circuitry 606. The radio control functions can include, but are not limited to, signal modulation and demodulation, encoding and decoding, and radio frequency shifting. In some implementations, modulation and demodulation circuitry of the baseband circuitry 610 can include Fast-Fourier Transform (FFT), precoding, or constellation mapping and demapping functionality. In some implementations, encoding and decoding circuitry of the baseband circuitry 610 can include convolution, tail-biting convolution, turbo, Viterbi. or Low Density Parity Check (LDPC) encoder and decoder functionality. Modulation and demodulation and encoder and decoder functionality are not limited to these examples and can include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 can include one or more single or multi-core processors. For example, the one or more processors can include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some implementations, some or all of the functionality of baseband processors 604A-D may be included in modules stored in the memory 604G and executed using a processor such as a Central Processing Unit (CPU) 604E. In some implementations, some or all of the functionality of baseband processors 604A-D may be provided as hardware accelerators (e.g., FPGAs or ASICs) loaded with the appropriate bit streams or logic blocks stored in respective memory cells. In some implementations, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. In addition, the baseband circuitry 610 includes one or more audio digital signal processor(s)(DSP) 604F. The audio DSP(s) 604F include elements for compression and decompression and echo cancellation and can include other suitable processing elements.

In some implementations, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 5); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi components, and/or the like); and a power management interface to send and receive power or control signals to and from the PMIC 525.

In some implementations (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems can include a bus system, point-to-point connections, network-on-chip (NOC) structures, or some other suitable bus or interconnect technology, such as those discussed herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, among other components. In some implementations, the baseband circuitry 610 can include protocol processing circuitry with one or more instances of control circuitry (not shown) to provide control functions for the digital baseband circuitry or radio frequency circuitry (e.g., the radio front end modules 615).

Although not shown in FIG. 6, in some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In some implementations, the PHY layer functions include the aforementioned radio control functions. In some implementations, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some implementations, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry can include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some implementations, the components of the baseband circuitry 610 may be suitably combined in a single chip or chipset, or disposed on a same circuit board. In some implementations, some or all of the constituent components of the baseband circuitry 610 and RF circuitry 606 may be implemented together such as, for example, a system on a chip (SoC) or System-in-Package (SiP). In some implementations, some or all of the constituent components of the baseband circuitry 610 may be implemented as a separate SoC that is communicatively coupled with and RF circuitry 606 (or multiple instances of RF circuitry 606). In some implementations, some or all of the constituent components of the baseband circuitry 610 and the application circuitry 405, 505 may be implemented together as individual SoCs mounted to a same circuit board (e.g., a "multi-chip package").

In some implementations, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some implementations, the RF circuitry 606 can include switches, filters, or amplifiers, among other components, to facilitate the communication with the wireless network. The RF circuitry 606 can include a receive signal path, which can include circuitry to down-convert RF signals received from the FEM circuitry 608 and provide baseband signals to the baseband circuitry 610. The RF circuitry 606 may also include a transmit signal path, which can include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some implementations, the transmit signal path of the RF circuitry 606 can include filter circuitry 606c and mixer circuitry 606a. The RF circuitry 606 also includes synthesizer circuitry 606d for synthesizing a frequency for use by the mixer circuitry 606a of the receive signal path and the transmit signal path. In some implementations, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, the mixer circuitry 606a of the receive signal path may comprise passive mixers.

In some implementations, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some implementations, the mixer circuitry 606a of the receive signal path and the mixer circuitry 606a of the transmit signal path can include two or more mixers and may be arranged for quadrature downconversion and upconversion, respectively. In some implementations, the mixer circuitry 606a of the receive signal path and the mixer circuitry 606a of the transmit signal path can include two or more mixers and may be arranged for image rejection (e.g., Hartley image rejection). In some implementations, the mixer circuitry 606a of the receive signal path and the mixer circuitry 606a of the transmit signal path may be arranged for direct downconversion and direct upconversion, respectively. In some implementations, the mixer circuitry 606a of the receive signal path and the mixer circuitry 606a of the transmit signal path may be configured for super-heterodyne operation.

In some implementations, the output baseband signals and the input baseband signals may be analog baseband signals. In some implementations, the output baseband signals and the input baseband signals may be digital baseband signals, and the RF circuitry 606 can include analog-to-digital converter (ADC) and digital-to-analog converter (DAC) circuitry and the baseband circuitry 610 can include a digital baseband interface to communicate with the RF circuitry 606. In some dual-mode examples, a separate radio IC circuitry may be provided for processing signals for each spectrum, although the techniques described here are not limited in this respect.

In some implementations, the synthesizer circuitry 606d may be a fractional-N synthesizer or a fractional N/N+1 synthesizer, although other types of frequency synthesizers may used. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some implementations, the synthesizer circuitry 606d may be a fractional N/N+1 synthesizer.

In some implementations, frequency input may be provided by a voltage controlled oscillator (VCO), although that is not a requirement. Divider control input may be provided by either the baseband circuitry 610 or the application circuitry 405/505 depending on the desired output frequency. In some implementations, a divider control input (e.g., N) may be determined from a look-up table based on a channel indicated by the application circuitry 405, 505.

The synthesizer circuitry 606d of the RF circuitry 606 can include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some implementations, the DLL can include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 606 can include an IQ or polar converter.

The FEM circuitry 608 can include a receive signal path, which can include circuitry configured to operate on RF signals received from antenna array 611, amplify the received signals and provide the amplified versions of the received signals to the RF circuitry 606 for further processing. The FEM circuitry 608 may also include a transmit signal path, which can include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some implementations, the FEM circuitry 608 can include a TX/RX switch to switch between transmit mode and receive mode operation. The FEM circuitry 608 can include a receive signal path and a transmit signal path. The receive signal path of the FEM circuitry 608 can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission by one or more antenna elements of the antenna array 611.

The antenna array 611 can include one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
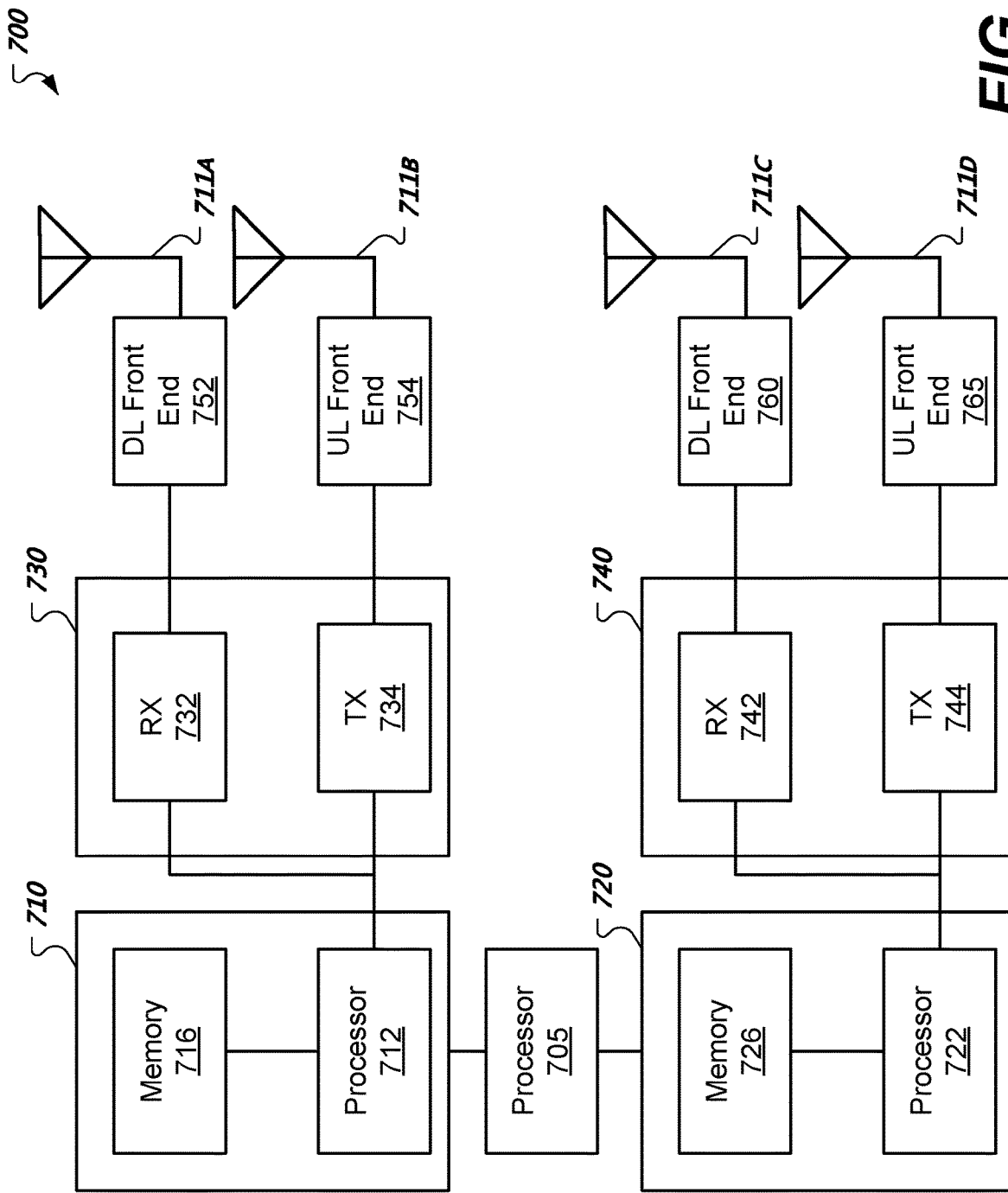
FIG. 7 illustrates example components of cellular communication circuitry.

FIG. 7 illustrates example components of communication circuitry 700. In some implementations, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 711A, 711B, 711C, and 711D. In some implementations, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR. In some implementations, a processor 705, such as an application processor, can interface with the modems 710, 720.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 can include circuitry for transmitting and receiving radio signals. For example, the RF front end 730 includes receive circuitry (RX) 732 and transmit circuitry (TX) 734. In some implementations, the receive circuitry 732 is in communication with a DL front end 752, which can include circuitry for receiving radio signals from one or more antennas 711A. The transmit circuitry 734 is in communication with a UL front end 754, which is coupled with one or more antennas 711B.

Similarly, the modem 720 includes one or more processors 722 and a memory 726 in communication with the one or more processors 722. The modem 720 is in communication with an RF front end 740, which may correspond to or be a part of to the RFEM 415 and 515 of FIGS. 4 and 5. The RF front end 740 can include circuitry for transmitting and receiving radio signals. For example, the RF front end 740 includes receive circuitry 742 and transmit circuitry 744. In some implementations, the receive circuitry 742 is in communication with a DL front end 760, which can include circuitry for receiving radio signals from one or more antennas 711C. The transmit circuitry 744 is in communication with a UL front end 765, which is coupled with one or more antennas 711D. In some implementations, one or more front-ends can be combined. For example, a RF switch can selectively couple the modems 710, 720 to a single UL front end 772 for transmitting radio signals using one or more antennas.

The processors 712, 722 can include one or more processing elements configured to implement various features described herein, such as by executing program instructions stored on the memory 716, 726 (e.g., a non-transitory computer-readable memory medium). In some implementations, the processor 712, 722 may be configured as a programmable hardware element, such as a FPGA or an ASIC. In some implementations, the processors 712, 722 can include one or more ICs that are configured to perform the functions of processors 712, 722.

Figure 8:
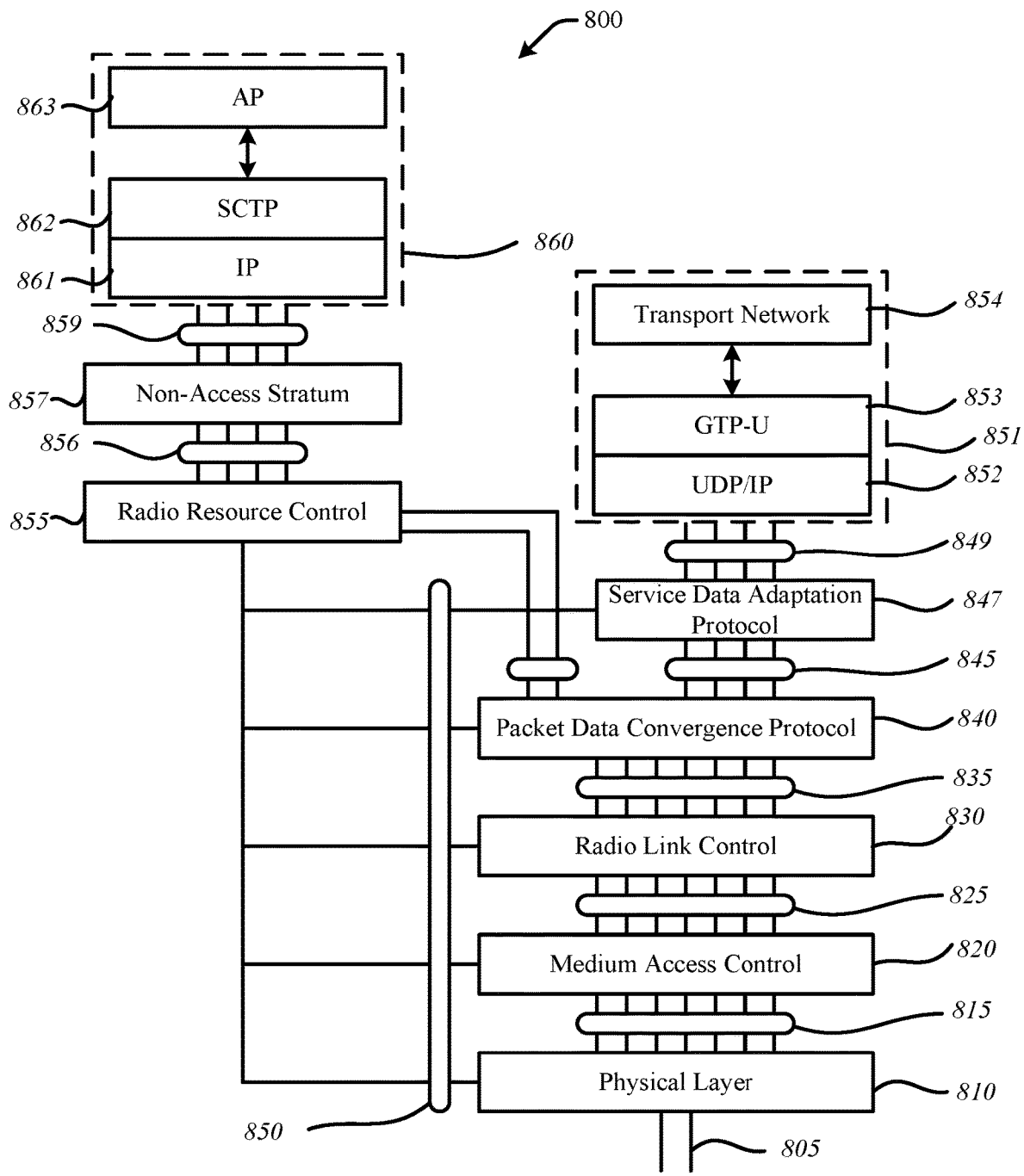
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 can include one or more of PHY 810, MAC 820, RLC 830, PDCP 840, SDAP 847, RRC 855, and NAS layer 857, in addition to other higher layer functions not illustrated. The protocol layers can include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 can include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some implementations, an instance of PHY 810 may process requests from and provide indications to an instance of MAC 820 using one or more PHY-SAP 815. In some implementations, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 can include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 can include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 can include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 can include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NO-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some implementations, the SDAP 847 may only be used in NR implementations and may not be used in LTE implementations.

The RRC 855 may configure, using one or more management service access points (M-SAP), aspects of one or more protocol layers, which can include one or more instances of PHY 810, MAC 820, RLC 830, PDCP 840 and SDAP 847. In some implementations, an instance of RRC 855 may process requests from and provide indications to one or more NAS entities 857 using one or more RRC-SAPs 856. The main services and functions of the RRC 855 can include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment. RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some implementations, one or more protocol entities of arrangement 800 may be implemented in UEs 101, RAN nodes 111. AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some implementations, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some implementations, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some implementations, a control plane protocol stack can include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some implementations, such as NR implementations, the AP 863 may be an NG application protocol layer (NGAP or NG-AP) 863 for the NO interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NO interface 113 and may comprise elementary procedures (EPs). An NG-AP EP may be a unit of interaction between the NG-RAN node 111 and the AMF 321. The NG-AP 863 services can include two groups: UE-associated services (e.g., services related to a UE 101) and non-UE-associated services (e.g., services related to the whole NO interface instance between the NG-RAN node 111 and AMF 321). These services can include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in CM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s)

for setting up the NO interface and monitoring for errors over the NO interface; a warning message transmission function for providing means to transfer warning messages using NO interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG-RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP can include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and can include X2AP basic mobility procedures and X2AP global procedures. The X2AP basic mobility procedures can include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 can include L2 and L1 layer communication links (e.g., wired or wireless) with the MME/AMF to exchange information.

In some implementations, a user plane protocol stack can include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and can include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node Ill, such as the baseband circuitry 610. In some implementations, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 9:
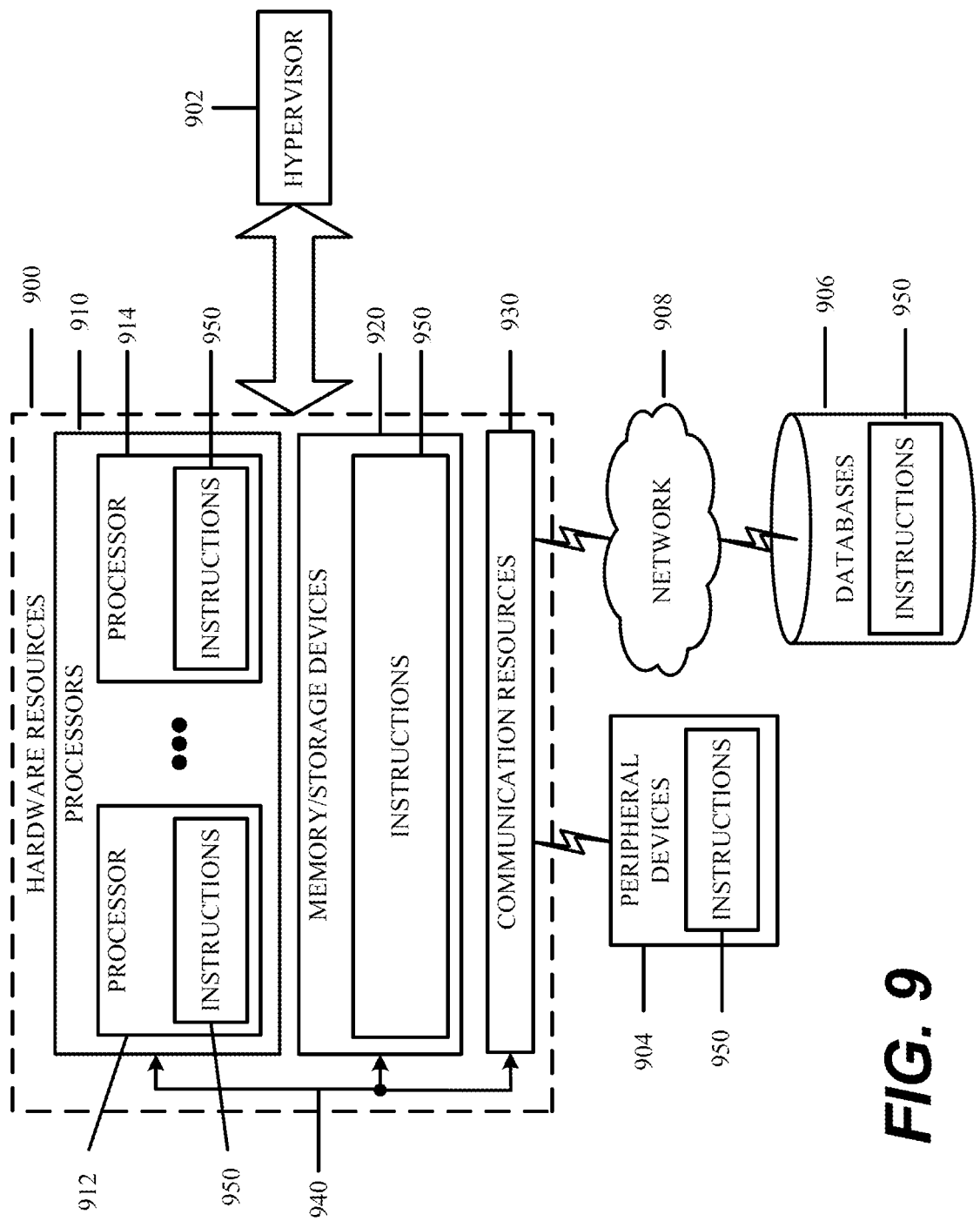
FIG. 9 illustrates an example of a computer system.

FIG. 9 illustrates a block diagram of example of a computer system that includes components for reading instructions from a machine-readable or computer-readable medium (e.g., a non-transitory machine-readable storage medium) and performing any one or more of the techniques described herein. In this example, FIG. 9 shows a diagrammatic representation of hardware resources 900 including one or more processors (or processor cores) 910, one or more memory or storage devices 920, and one or more communication resources 930, each of which may be communicatively coupled using a bus 940. For implementations where node virtualization (e.g., NFV) is utilized, a hypervisor 902 may be executed to provide an execution environment for one or more network slices or sub-slices to utilize the hardware resources 900.

The processors 910 can include a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 can include main memory, disk storage, or any suitable combination thereof. The memory/storage devices 920 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 930 can include interconnection or network interface components or other suitable devices to communicate with one or more peripheral devices 904 or one or more databases 906 using a network 908. For example, the communication resources 930 can include wired communication components (e.g., for coupling using USB), cellular communication components, NFC components, Bluetooth® (or Bluetooth® Low Energy) components, Wi-Fi components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

RRC states for UE can include an idle state and a connected state. The RRC states can also include an inactive state where the UE is registered with the network but not actively transmitting data. A connection resume procedure can prepare a UE for subsequent data transmission and/or reception by causing the UE to switch from an inactive state to a connected state. In 5G NR, the RRC states for a 5G NR enabled UE can include RRC_IDLE, RRC_INACTIVE, and RRC_CONNECTED states. When not transmitting data in a RRC_CONNECTED state, the UE can switch to a RRC_INACTIVE state but remain registered with the network. The UE can be configured for DRX operations including eDRX operations. In DRX, the UE can be in a DRX cycle, e.g., sleep cycle, such that it is not able to receive transmissions. In some implementations, a DRX cycle is 0.256 seconds. In eDRX, the DRX cycle is extended to a longer duration such as 5.12 sec or greater, e.g., up to 44 minutes or up to 3 hours. Other time values are possible. In some implementations, the eDRX cycle is configurable.

A connection resume procedure when mobile terminating data arrives can be used to support user plane optimization for CIoT 5G when the UE supports eDRX and is in a RRC_INACTIVE state. A network can use one or more procedures to deliver downlink data to the UE when the UE is in eDRX and RRC_INACTIVE. These procedures include network triggered connection resume procedures for mobile terminating data.

Figure 10:
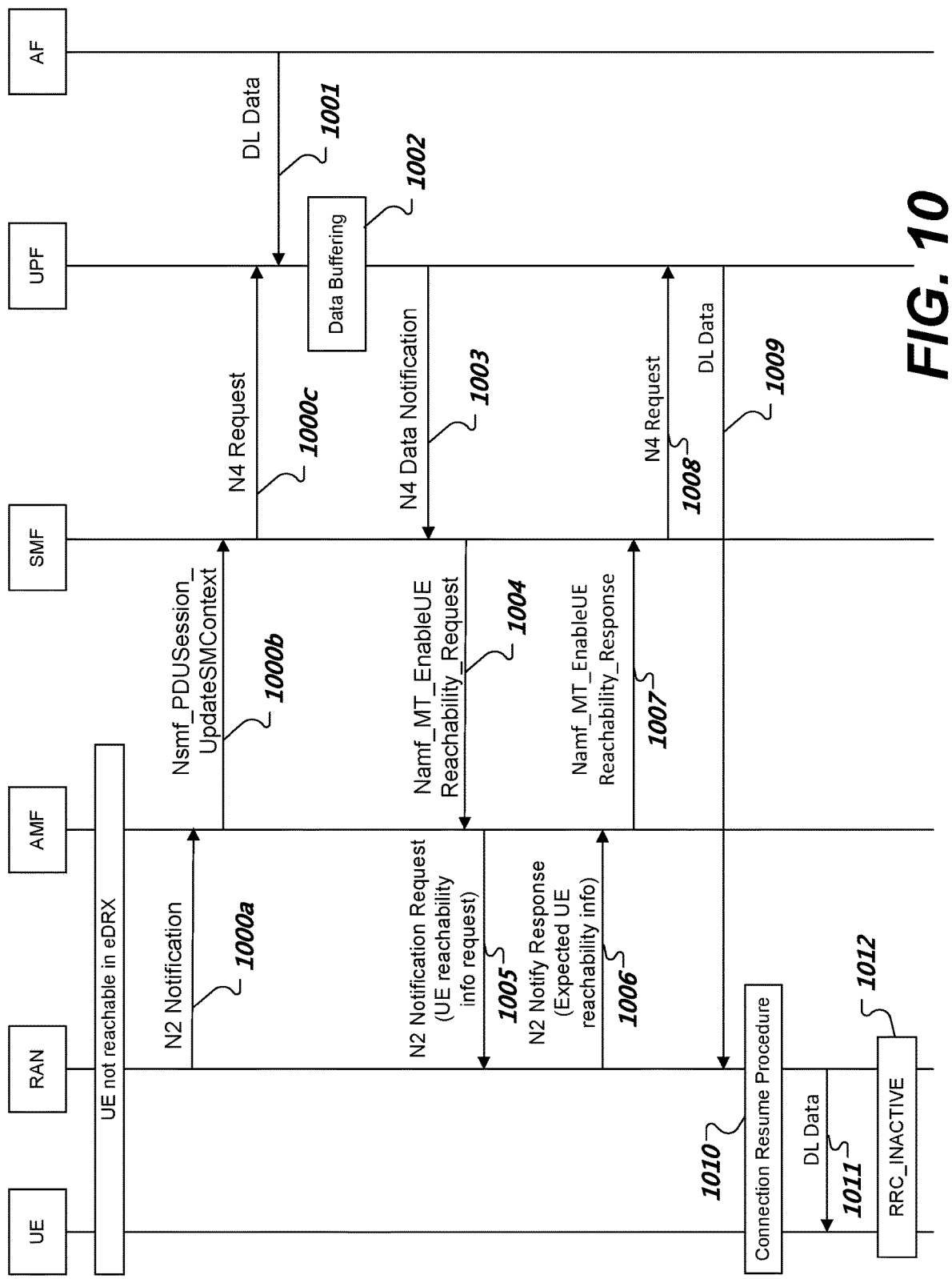
FIG. 10 illustrates an example of a network triggered communication procedure for mobile terminating data.

FIG. 10 illustrates an example of a network triggered communication procedure for mobile terminating data. In this example, a wireless system includes a UE, RAN, and devices for providing the AMF, SMP, UPF, and AF respectively. Initially, the UE is not reachable for mobile terminating data because the UE is in eDRX and in an RRC_INACTIVE state. The UE is in a CM-CONNECTED state with the AMF. At steps 1000a, 1000b, and 1000c (collectively step 1000), the RAN, AMF, SMF, and UPF operate to provide information, such as UE notifications and/or buffer support information, for subsequent downlink transmissions. At step 1000a, the RAN sends a N2 notification to the AMF. In some implementations, the N2 notification includes information indicating that the UE is in eDRX. In some implementations, the N2 notification includes buffer support information. At step 1000b, the AMF uses the Nsmf_PDUSession_UpdateSMContext service to send information, including the buffering support information, to the SMF. At step 1000c, the SMF sends a N4 request message to the UPF and activates extended buffering in the UPF based on the buffer support information sent by the RAN.

At step 1001, the AF sends downlink data to the UPF. At step 1002, the UPF buffers the downlink data based on information collected via step 1000c, e.g., buffer support information and learning that the UE is in eDRX. Buffering the downlink data at the UPF can be advantageous because it can reduce the need for buffer space at the RAN. Buffering the downlink data at the UPF can be advantageous in cases where the UE switches RAN nodes where the UPF can forward data to the new RAN node.

At step 1003, the UPF sends a N4 data notification message to the SMF. At step 1004, the SMF requests a UE reachability report via the Namf_MT_EnableUEReachability_Request based on the N4 data notification sent from the UPF. In some implementations, the SMF can wait for the next MO data from UE to trigger the sending of downlink data without invoking the UE reachability reporting.

At step 1005, the AMF sends a N2 notification request, which includes a UE reachability information request, to the RAN. The trigger for AMF to send the N2 notification request message to obtain information on UE reachability from the RAN is based on the UE being in the RRC_INACTIVE state (as notified from RAN in step 1000) and UE supporting eDRX (as negotiated by the network) and the arrival of DL data in step 1001.

At step 1006, the RAN sends a N2 notification response to the AMF with the expected UE reachability information derived from the next paging occasion. The next paging occasion can be based on a predetermined duration of an eDRX cycle. The N2 notification response can include updated buffering support information. At step 1007, the AMF sends a message to notify the SMF about the expected UE reachability information. The message can include updated buffering support information. In some implementations, the AMF uses, at step 1007, a Namf_MT_EnableUEReachability_Response message to notify the SMF. At step 1008, the SMF sends a N4 request message to update the UPF with the expected UE reachability information and buffering support information for the UPF downlink tunnel if needed. At step 1009, based on the UE reachability information received in step 1008, the UPF sends the buffered data to the RAN when the UE is expected to become reachable.

At step 1010, the RAN executes a connection resume procedure with the UE. An example of a connection resume procedure is given by FIG. 12. Other connection resume procedures are possible. At step 1011, the RAN delivers the downlink data to the UE. At step 1012, the RAN moves the UE to the RRC_INACTIVE state after a user inactivity timeout or based on release assistance information if available in expected UE behavior information.

Figure 11:
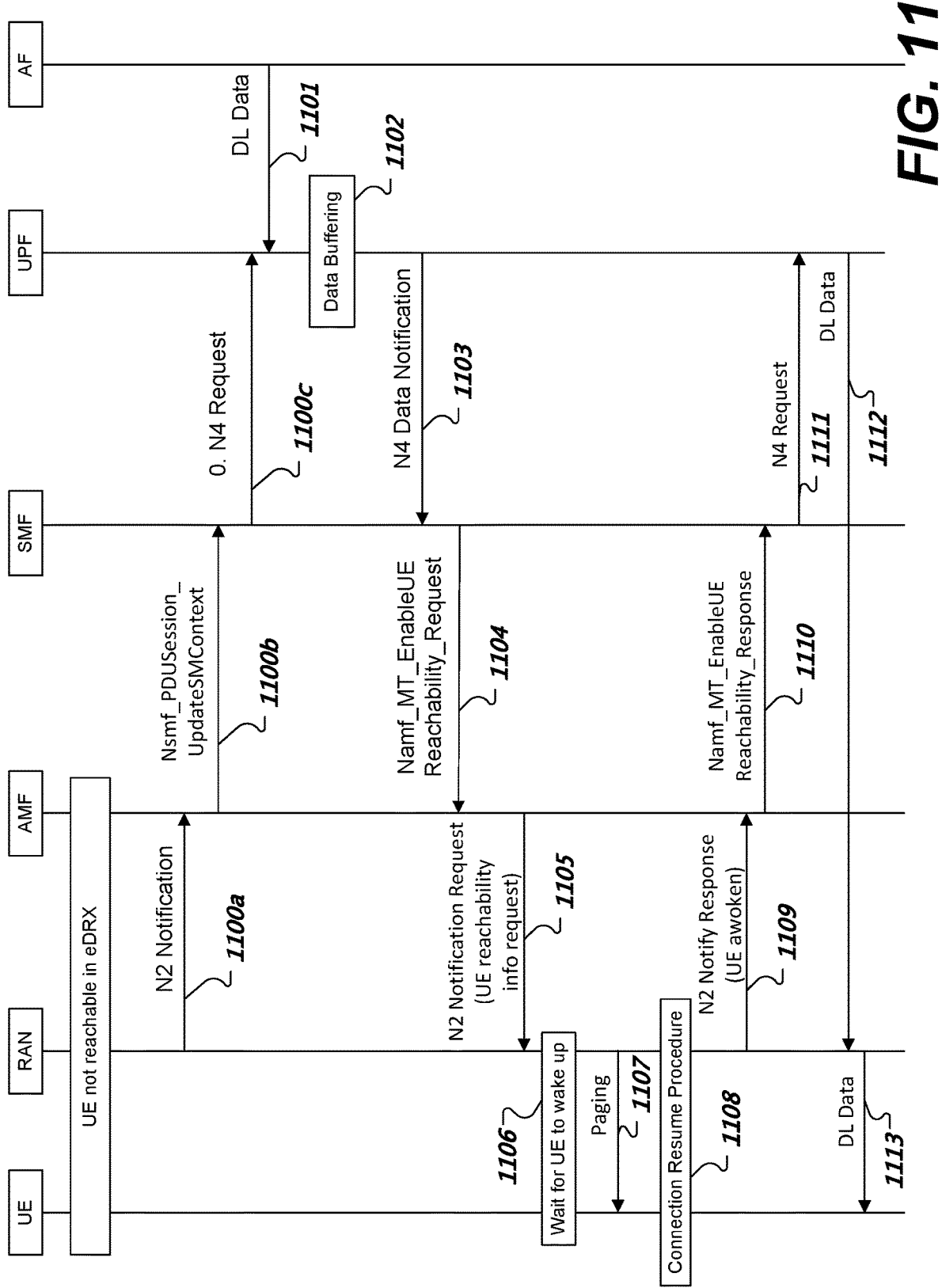
FIG. 11 illustrates another example of a network triggered communication procedure for mobile terminating data.

FIG. 11 illustrates another example of a network triggered communication procedure for mobile terminating data. In this example, a wireless system includes a UE, RAN, and devices for providing the AMF, SMF, UPF, and AF respectively. Initially, the UE is not reachable for mobile terminating data because the UE is in eDRX and in an RRC_INACTIVE state. The UE is in a CM-CONNECTED state with the AMF. At steps 1100a, 1100b, and 1100c (collectively step 1100), the RAN, AMF, SMF, and UPF operate to provide buffer support information for a DL transmission. At step 1100a, the RAN sends a N2 notification to the AMF. In some implementations, the N2 notification includes information indicating that the UE is in eDRX. In some implementations, the N2 notification includes buffer support information. At step 1100b, the AMF uses the Nsmf_PDUSession_UpdateSMContext service to send information, including the buffering support information, to the SMF. At step 1100c, the SMF sends a N4 request message to the UPF and activates extended buffering in the UPF based on the buffer support information sent by the RAN.

At step 1101, the AF sends downlink data to the UPF. At step 1102, the UPF buffers the downlink data based on information collected via step 1100c, e.g., buffer support information and learning that the UE is in eDRX. At step 1103, the UPF sends a N4 data notification message to the SMF. At step 1104, the SMF requests a UE reachability report via the Namf_MT_EnableUEReachability_Request based on the N4 data notification sent from the UPF. In some implementations, the SMF can wait for the next MO data from UE to trigger the sending of downlink data without invoking the UE reachability reporting.

At step 1105, the AMF sends a N2 notification request, which includes a UE reachability information request, to the RAN. The trigger for AMF to send the N2 notification request message to obtain information on UE reachability from the RAN is based on the UE being in the RRC_INACTIVE state (as notified from RAN in step 1100) and UE supporting eDRX (as negotiated by the network) and the arrival of DL data in step 1101.

At step 1106, the RAN waits for the UE to become reachable. Note that the RAN is aware of UE's eDRX cycle such that it can determining the next paging occasion. At step 1107, the RAN initiates RAN paging based on when the UE is supposed to be reachable in accordance with its eDRX cycle. Note that at this point there is no buffered data pending in the RAN because the DL data are buffered at the UPF (starting from step 1102). At step 1108, the UE and RAN perform a connection resume procedure such as the one illustrated by FIG. 12. The UE responds to the RAN's paging at 1107 by resuming the RRC connection and entering the RRC_CONNECTED state.

At step 1109, the RAN sends a N2 notification response message to the AMF indicating that the UE is now reachable. At step 1110, based on receiving the N2 notification response, the AMF sends a Namf_MT_EnableUEReachability_Response to the SMF to indicate that the UE is now reachable. At step 1111, the SMF sends an N4 request to the UPF to unblock the buffered data. At step 1112, the UPF forwards the downlink data to the RAN. At step 1113, the RAN forwards the downlink data to the UE.

Figure 12:
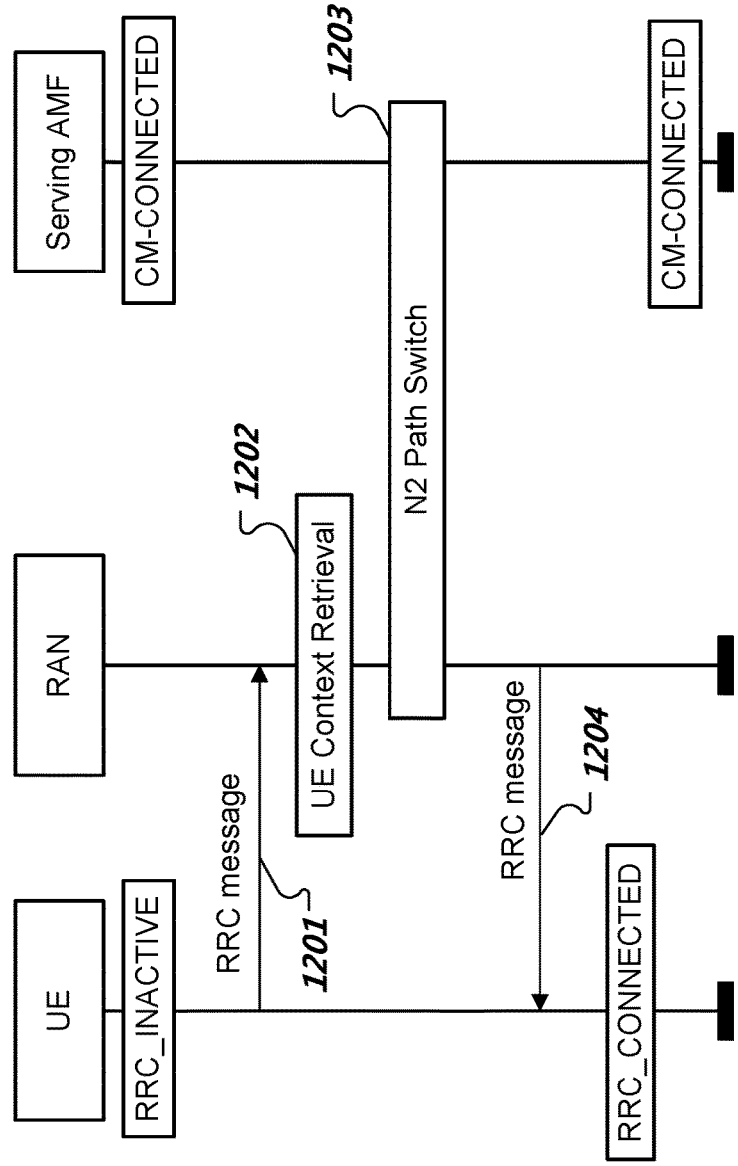
FIG. 12 illustrates an example of a connection resume procedure.

FIG. 12 illustrates an example of a connection resume procedure 1200. The connection resume procedure 1200 causes a UE to transition from an RRC_INACTIVE state to a RRC_CONNECTED state. In some implementations, a trigger for procedure 1200 is a paging message sent by a RAN. Various types of triggers are possible including those in 3GPP TS 23.501, clause 5.3.3.2.5. At step 1201, the UE sends a RRC message, containing a RRC resume request, to the RAN. In some implementations, the UE initiates the transition from the RRC_INACTIVE state to the RRC_CONNECTED state, see, e.g., 3GPP TS 38.300. The RRC message can include a Resume ID associated with the UE. The UE can provide its Resume ID so that the RAN can access the UE's stored Context.

At step 1202, the RAN performs a UE context retrieval if required. A UE context retrieval can be performed when the UE context associated with the UE attempting to resume its connection is not locally available at the accessed RAN. In some implementations, the UE context retrieval procedure via a radio access network is based on 3GPP TS 38.300. At step 1203, the RAN and the serving AMF can perform a N2 path switch procedure if needed. If the accessed RAN is able to retrieve the UE context, the accessed RAN node can initiate a N2 path switch procedure. In some implementations, a N2 path switch procedure includes steps 1 to 8 of clause 4.9.1.2.2 of 3GPP TS 23.502 and can include Xn data forwarding. If the connection resume procedure 1200 is a response to RAN paging which is triggered by 5GC due to an N2 interface procedure, RAN and 5GC can handle the N2 interface procedure as a collision described in clause 4.9.1.2 of 3GPP TS 23.502. The RAN can send a UE notification message to report that the UE is in the RRC_CONNECTED state if an AMF requested a N2 notification (see, e.g., clause 4.8.3 of 3GPP TS 23.502) to the RAN.

At step 1204, the RAN can send a RRC message, e.g., resume response, to the UE. The RAN confirms to the UE that the UE has entered the RRC_CONNECTED state. In some implementations, steps 1203 and 1204 can be executed in parallel.

Figure 13:
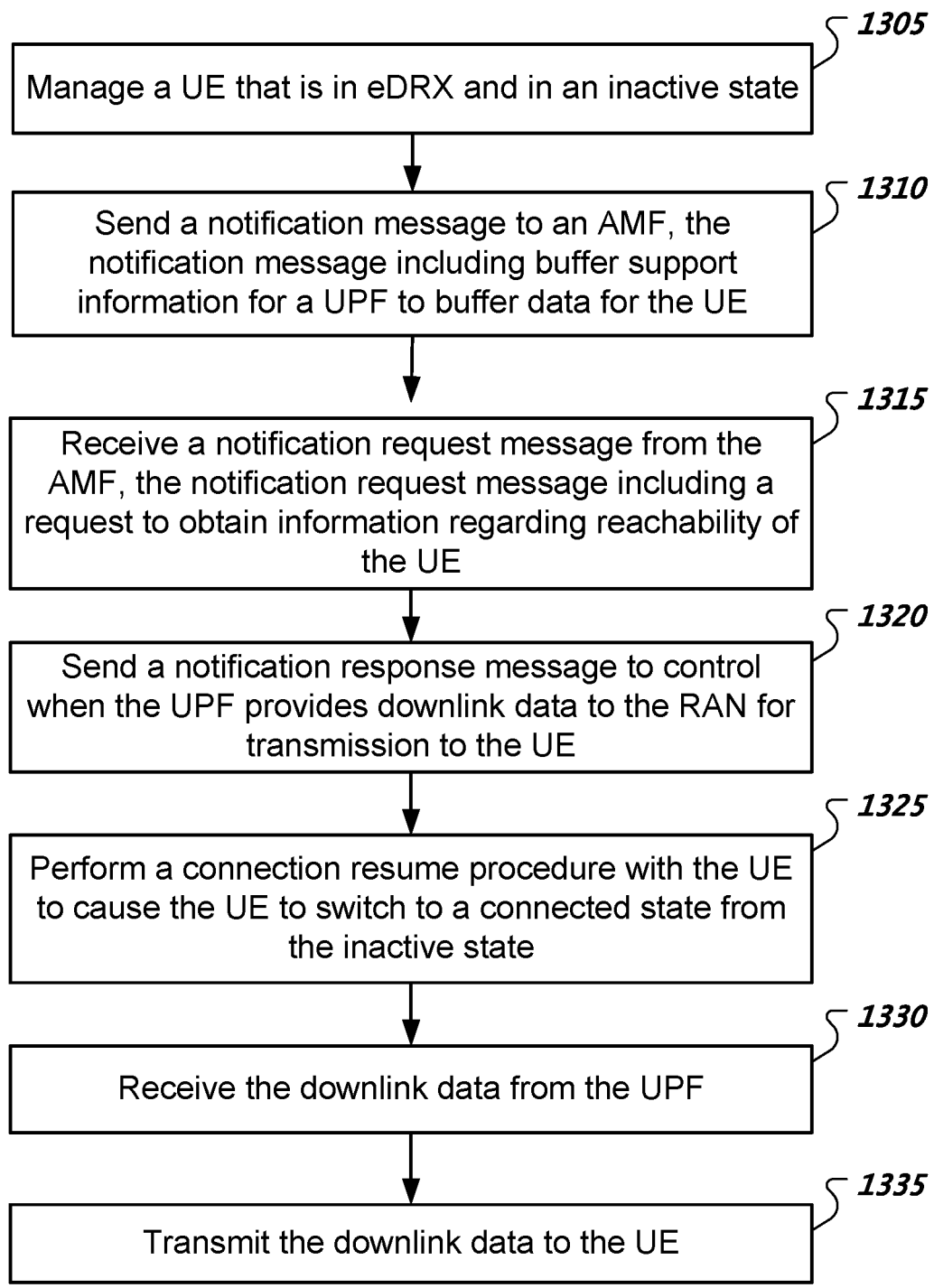
FIG. 13 illustrates a flowchart of an example of a process associated with buffering and delivering downlink data to a UE.

FIG. 13 illustrates a flowchart of an example of a process associated with buffering and delivering downlink data to a UE. This process can be performed by a RAN, including by a node of RAN, such as RAN 110 of FIG. 1 and RAN 310 of FIG. 3. At 1305, the RAN manages a UE that is in eDRX and in an inactive state such as a RRC_INACTIVE state. Such management can include maintaining the UE's eDRX configuration, tracking when a UE entered an eDRX cycle, and/or determining when the UE should exit the eDRX cycle and enter into an awake state. At 1310, the RAN sends a notification message to an AMF. The notification message can include information to cause a UPF to buffer data for the UE. In some implementations, the notification message can include an indication that the UE is in an eDRX cycle and/or that the UE is in an inactive state. In some implementations, the notification message can include buffer support information for a UPF to buffer data for the UE.

At 1315, the RAN receives a notification request message from the AMF. The notification request message can include a request to obtain information regarding reachability of the UE. In some implementations, the notification request message is triggered by an AF sending data to a UPF for the UE. At 1320, the RAN sends a notification response message to control when the UPF provides downlink data to the RAN for transmission to the UE.

At 1325, the RAN performs a connection resume procedure with the UE to cause the UE to switch to a connected state from the inactive state. At 1330, the RAN receives the downlink data from the UPF. Receiving the downlink data can include receiving the downlink data at a network interface connected to a network. At 1335, the RAN transmits the downlink data to the UE. Transmitting the downlink data to the UE can include causing a transceiver to transmit one or more signals to the UE.

In some implementations, the RAN can determine a next paging occasion for the UE in accordance with a predetermined eDRX cycle duration. The RAN can generate expected UE reachability information based on the next paging occasion which can be include in the notification response message sent at step 1320.

In some implementations, step 1325 can be performed before step 1320, e.g., the RAN transmits a page to the UE based on the next paging occasion to trigger the connection resume procedure and waits to send the notification response message sent at step 1320 until after the UE has awaken. In such implementations, the notification response message can include a notification that the UE is ready to receive data.

A wireless communication system can support UEs in eDRX and in the RRC_INACTIVE state. A UPF can receive DL data for a UE. An AMF can send a N2 notification request to the RAN requesting UE reachability information. In some implementations, a trigger for AMF to send the N2 notification request message to obtain information on UE reachability from the RAN is based on the UE being in a RRC_INACTIVE state (as notified from RAN) and UE supporting eDRX (as negotiated by the network) and the arrival of DL data. The RAN can send a N2 notification response to the AMF with the expected UE reachability information derived from the next paging occasion. The AMF can notify the SMF with the expected UE reachability information. The SMF can send a N4 request to update the UPF with the expected UE reachability information. The UPF can send the buffered data to the RAN when the UE is expected to become reachable.

In some communication systems, a RAN can transition an eDRX capable UE to an RRC_INACTIVE state; and can send an N2 notification to an AMF. The N2 notification can include buffer support information. The AMF can be configured to provide the buffer support information to a SMF using an Nsmf_PDUSession_UpdateSMContext service. The SMF can use one or more N4 messages and activate extended buffering in a UPF based on the buffering information.

The UPF can send an N4 data notification message to the SMF. The SMF can send a request for a UE reachability report via a Namf_MT_EnableUEReachability service based on the N4 data notification sent from the UPF. In some implementations, the UPF sends an N4 data notification message to the SMF, and the SMF waits for next MO data from the UE to trigger sending of downlink data without the UE reachability reporting.

A RAN can receive an N2 notification request from the AMF. The N2 notification request can include a UE reachability information request. In some implementations, a trigger for the AMF to send the N2 notification request message to obtain information on UE reachability from the RAN is based on the UE being in an RRC_INACTIVE state as notified in the N2 notification, the UE supporting eDRX, and arrival of DL data. The RAN can send an N2 notification response to the AMF. The N2 notification response can include expected UE reachability information derived from a next paging occasion. In some implementations, the N2 notification response can include updated buffering support information.

The AMF can notify the SMF about the expected UE reachability information and updated buffering support information if present in the N2 notification response. The SMF can send an N4 request to update the UPF with the expected UE reachability information and buffering support information for the UPF Downlink Tunnel if needed. The UPF can send buffered data to the RAN when the UE is expected to become reachable based on the UE reachability information. The RAN can execute a connection resume procedure; transmit downlink data to the UE; and transition the UE to the RRC_INACTIVE state after a user inactivity timeout is detected or based on a release assistance information (RAI) if available in expected UE behavior information.

In some implementations, the RAN can wait until the UE becomes reachable or in a connected state before sending a N2 notification response to the AMF. For example, the RAN can wait for the UE to become reachable; and can initiate a paging procedure with the UE when the UE is supposed to be reachable in accordance with an eDRX cycle of the UE. In some implementations, there is no buffered data pending because the DL data are buffered at the UPF. The RAN can receive an RRC message from the UE in response to the paging procedure. The paging procedure can include transmitting a paging message to the UE. The RRC message can include a request to resume a previously existing RRC connection. During the connection resume procedure, the UE enters an RRC_CONNECTED state. The RAN can send an N2 notification response to the SMF via the AMF based on the paging procedure, the N2 notification response indicating that the UE is now reachable. The SMF can send an N4 Request to the UPF to unblock the buffered data. The RAN can receive downlink data from the UPF; and can forward the downlink data to the UE.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. Examples of processors can include Apple A-series processors, Intel® Architecture Core™ processors, AMD processors, and Qualcomm processors. Other types of processors are possible. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   managing a user equipment (UE) that is in an extended discontinuous reception mode and in an inactive state;
   sending a notification message to an access and mobility management function (AMF), the notification message comprising information to cause a user plane function (UPF) to buffer data for the UE;
   receiving a notification request message from the AMF, the notification request message comprising a request to obtain information regarding reachability of the UE;
   sending a notification response message to the AMF to control when the UPF provides downlink data to a radio access network (RAN) for transmission to the UE;
   performing a connection resume procedure with the UE to cause the UE to switch to a connected state from the inactive state;
   receiving the downlink data from the UPF; and
   transmitting the downlink data to the UE,
   wherein the UE is associated with a first node of the RAN before entering a sleeping cycle in accordance with the extended discontinuous reception mode,
   wherein performing the connection resume procedure comprises operating a second node of the RAN to perform the connection resume procedure with the UE, and
   wherein the UPF is configured to forward the downlink data to the second node.

2. The method of claim 1, comprising:
   determining a next paging occasion for the UE in accordance with the extended discontinuous reception mode.

3. The method of claim 2, comprising:
   generating expected UE reachability information based on the next paging occasion, wherein the notification response message comprises the expected UE reachability information.

4. The method of claim 3, wherein the UPF is configured to forward the downlink data in accordance with the expected UE reachability information.

5. The method of claim 2, comprising:
   transmitting a page to the UE based on the next paging occasion to trigger the connection resume procedure.

6. The method of claim 5, wherein sending the notification response message is based on a completion of the connection resume procedure.

7. The method of claim 5, wherein the notification response message comprises a notification that the UE is ready to receive data.

8. The method of claim 7, wherein the UPF is configured to forward the downlink data upon receipt of the notification that the UE is ready to receive data.

9. The method of claim 1, wherein the notification request message is triggered by receiving data at the UPF for the UE.

10. A system comprising:
    one or more processors;
    circuitry configured to communicate with devices comprising a user equipment (UE);
    circuitry configured to communicate with a device, the device being configured to provide an access and mobility management function (AMF); and
    a memory storing instructions that, when executed by the one or more processors, cause the one or more processors to perform operations comprising:
    managing a UE that is in an extended discontinuous reception mode and in an inactive state;
    sending a notification message to the AMF, the notification message comprising buffer support information for a user plane function (UPF) to buffer data for the UE;
    receiving a notification request message from the AMF, the notification request message comprising a request to obtain information regarding reachability of the UE;
    sending a notification response message to control when the UPF provides downlink data to a radio access network (RAN) for transmission to the UE;
    performing a connection resume procedure with the UE to cause the UE to switch to a connected state from the inactive state;
    receiving the downlink data from the UPF; and
    transmitting the downlink data to the UE,
    wherein the UE is associated with a first node of the RAN before entering a sleeping cycle in accordance with the extended discontinuous reception mode, wherein performing the connection resume procedure comprises causing a second node of the RAN to perform the connection resume procedure with the UE, and wherein the UPF is configured to forward the downlink data to the second node.

11. The system of claim 10, wherein the operations comprise:

determining a next paging occasion for the UE in accordance with the extended discontinuous reception mode.

12. The system of claim 11, wherein the operations comprise:

generating expected UE reachability information based on the next paging occasion, wherein the notification response message comprises the expected UE reachability information.

13. The system of claim 12, wherein the UPF is configured to forward the downlink data in accordance with the expected UE reachability information.

14. The system of claim 11, wherein the operations comprise:

transmitting a page to the UE based on the next paging occasion to trigger the connection resume procedure.

15. The system of claim 14, wherein sending the notification response message is based on a completion of the connection resume procedure.

16. The system of claim 14, wherein the notification response message comprises a notification that the UE is ready to receive data.

17. The system of claim 16, wherein the UPF is configured to forward the downlink data upon receipt of the notification that the UE is ready to receive data.

18. The system of claim 10, wherein the notification request message is triggered by receiving data at the UPF for the UE.

* * * * *